US009614643B2

(12) United States Patent
Kim et al.

(10) Patent No.: US 9,614,643 B2
(45) Date of Patent: Apr. 4, 2017

(54) METHOD FOR TRANSMITTING A DOWNLINK CONTROL CHANNEL BY A BASE STATION IN A WIRELESS COMMUNICATION SYSTEM, AND APPARATUS THEREFOR

(75) Inventors: Hakseong Kim, Anyang-si (KR); Hanbyul Seo, Anyang-si (KR); Kijun Kim, Anyang-si (KR)

(73) Assignee: LG ELECTRONICS INC., Seoul (KR)

( * ) Notice: Subject to any disclaimer, the term of this patent is extended or adjusted under 35 U.S.C. 154(b) by 168 days.

(21) Appl. No.: 14/117,176

(22) PCT Filed: Jul. 5, 2012

(86) PCT No.: PCT/KR2012/005335
§ 371 (c)(1),
(2), (4) Date: Nov. 12, 2013

(87) PCT Pub. No.: WO2013/009035
PCT Pub. Date: Jan. 17, 2013

(65) Prior Publication Data
US 2014/0376456 A1    Dec. 25, 2014

Related U.S. Application Data

(60) Provisional application No. 61/505,547, filed on Jul. 8, 2011, provisional application No. 61/508,082, filed (Continued)

(51) Int. Cl.
*H04L 1/16*    (2006.01)
*H04L 1/00*    (2006.01)
(Continued)

(52) U.S. Cl.
CPC .......... *H04L 1/0038* (2013.01); *H04L 1/0046* (2013.01); *H04L 1/18* (2013.01);
(Continued)

(58) Field of Classification Search
USPC ........................................................ 370/329
See application file for complete search history.

(56) References Cited

U.S. PATENT DOCUMENTS

2007/0280193 A1* 12/2007 Kim ...................... H04L 1/1678
370/349
2009/0088148 A1* 4/2009 Chung .................. H04L 5/0007
455/423
(Continued)

FOREIGN PATENT DOCUMENTS

KR    10-2010-0051528    5/2010
KR    10-2011-0010681    2/2011

OTHER PUBLICATIONS

PCT International Application No. PCT/KR2012/005335, Written Opinion of the International Searching Authority dated Jan. 21, 2013, 14 pages.
(Continued)

*Primary Examiner* — Charles C Jiang
*Assistant Examiner* — Kyaw Z Soe
(74) *Attorney, Agent, or Firm* — Lee Hong Degerman Kang Waimey

(57) ABSTRACT

Disclosed in the present application is a method for receiving an ACK/NACK (Acknowledgement/Negative Acknowledgement) signal by a terminal in a wireless communication system. More specifically, the method comprises the steps of: transmitting an uplink data signal to a base station; a blind decoding of downlink control information including an ACK/NACK response signal regarding the uplink data signal so as to acquire a decoded signal; and checking the ACK/NACK response signal, corresponding to the terminal, from among the downlink control information. The downlink control information consists of ACK/NACK response signals corresponding to a plurality of terminals.

4 Claims, 24 Drawing Sheets

Related U.S. Application Data on Jul. 15, 2011, provisional application No. 61/522,673, filed on Aug. 11, 2011.

(51) Int. Cl.
    *H04L 1/18*     (2006.01)
    *H04W 72/04*     (2009.01)
    *H04L 5/00*     (2006.01)

(52) U.S. Cl.
    CPC ......... *H04L 5/0055* (2013.01); *H04W 72/042* (2013.01); *H04L 1/1607* (2013.01)

(56) References Cited

U.S. PATENT DOCUMENTS

| | | | |
|---|---|---|---|
| 2009/0168922 A1* | 7/2009 | Malladi | H04W 72/042 375/316 |
| 2009/0259909 A1 | 10/2009 | Luo | |
| 2010/0202433 A1* | 8/2010 | Ihm | H04L 1/0656 370/343 |
| 2011/0026622 A1* | 2/2011 | Luo | H04L 1/1614 375/260 |
| 2011/0044259 A1 | 2/2011 | Nimbalker et al. | |
| 2011/0194525 A1* | 8/2011 | Nishio | H04L 1/1854 370/329 |
| 2011/0310820 A1* | 12/2011 | Liao | H04L 1/1614 370/329 |
| 2012/0033643 A1* | 2/2012 | Noh | H04L 1/0083 370/335 |
| 2012/0120908 A1* | 5/2012 | Ahn | H04L 1/1607 370/329 |
| 2012/0207126 A1* | 8/2012 | Qu | H04L 5/005 370/330 |
| 2013/0094449 A1* | 4/2013 | Takeda | H04L 1/1854 370/329 |
| 2014/0050174 A1* | 2/2014 | Zhang | H04L 1/1861 370/329 |

OTHER PUBLICATIONS

PCT International Application No. PCT/KR2012/005335, Written Opinion of the International Searching Authority dated Jan. 21, 2013, 11 pages.

* cited by examiner (a) Control-Plane Protocol Stack (b) User-Plane Protocol Stack (a) 1TX or 2TX (b) 4 TX

METHOD FOR TRANSMITTING A DOWNLINK CONTROL CHANNEL BY A BASE STATION IN A WIRELESS COMMUNICATION SYSTEM, AND APPARATUS THEREFOR

CROSS-REFERENCE TO RELATED APPLICATIONS

This application is the National Stage filing under 35 U.S.C. 371 of International Application No. PCT/KR2012/005335, filed on Jul. 5, 2012, which claims the benefit of U.S. Provisional Application Ser. Nos. 61/505,547, filed on Jul. 8, 2011, 61/508,082, filed on Jul. 15, 2011, and 61/522,673filed on Aug. 11, 2011, the contents of which are all hereby incorporated by reference herein in their entirety.

TECHNICAL FIELD

The present invention relates to a wireless communication system, and more particularly, to a method and apparatus for transmitting downlink (DL) control channel from a base station (BS) in a wireless communication system.

BACKGROUND ART

As an example of a wireless communication system to which the present invention is applicable, a $3^{rd}$ generation partnership project (3GPP) long term evolution (LTE) communication system will be schematically described.

FIG. 1 is a schematic diagram showing a network structure of an evolved universal mobile telecommunications system (E-UMTS) as an example of a wireless communication system. The E-UMTS is an evolved form of the legacy UMTS and has been standardized in the 3GPP. In general, the E-UMTS is also called an LTE system. For details of the technical specification of the UMTS and the E-UMTS, refer to Release 7 and Release 8 of "$3^{rd}$ generation partnership project; technical specification group radio access network".

Referring to FIG. 1, the E-UMTS includes a user equipment (UE), an evolved node B (eNode B or eNB), and an access gateway (AG) which is located at an end of an evolved UMTS terrestrial radio access network (E-UTRAN) and connected to an external network. The eNB may simultaneously transmit multiple data streams for a broadcast service, a multicast service and/or a unicast service.

One or more cells may exist per eNB. The cell is set to operate in one of bandwidths such as 1.44, 3, 5, 10, 15, and 20 MHz and provides a downlink (DL) or uplink (UL) transmission service to a plurality of UEs in the bandwidth. Different cells may be set to provide different bandwidths. The eNB controls data transmission or reception to and from a plurality of UEs. The eNB transmits DL scheduling information of DL data to a corresponding UE so as to inform the UE of a time/frequency domain in which the DL data is supposed to be transmitted, coding, a data size, and hybrid automatic repeat and request (HARQ)-related information. In addition, the eNB transmits UL scheduling information of UL data to a corresponding UE so as to inform the UE of a time/frequency domain which may be used by the UE, coding, a data size, and HARQ-related information. An interface for transmitting user traffic or control traffic may be used between eNBs. A core network (CN) may include the AG and a network node or the like for user registration of UEs. The AG manages the mobility of a UE on a tracking area (TA) basis. One TA includes a plurality of cells.

Although wireless communication technology has been developed to LTE based on wideband code division multiple access (WCDMA), the demands and expectations of users and service providers are on the rise. In addition, considering other radio access technologies under development, new technological evolution is required to secure high competitiveness in the future. Decrease in cost per bit, increase in service availability, flexible use of frequency bands, a simplified structure, an open interface, appropriate power consumption of UEs, and the like are required.

DISCLOSURE

Technical Problem

An object of the present invention devised to solve the problem lies in a method of and apparatus for transmitting downlink (DL) control channel from a base station (BS) in a wireless communication system.

Technical Solution

The object of the present invention can be achieved by providing a method for receiving downlink acknowledgement/negative-ACK (ACK/NACK) signal by a user equipment (UE) in a wireless communication system, the method including transmitting a uplink data signal to a base station (BS), blind decoding downlink control information including an ACK/NACK response signal of the uplink data signal to acquire decoded information, and checking the ACK/NACK response signal corresponding to the UE from the downlink control information, wherein the downlink control information includes an ACK/NACK response signal corresponding to a plurality of UEs.

A position of the ACK/NACK response signal corresponding to the UE from the downlink control information may be associated with at least one of a parameter of a UE-specific reference signal for transmitting the uplink data and a resource index for transmitting the uplink data signal.

In addition, the downlink control information may include ACK/NACK response signals corresponding to a plurality of codewords when the uplink data signal includes the plural codewords. In this case, a position of the ACK/NACK response signal corresponding to the UE from the downlink control information may be associated with at least one of an index of the codeword and a resource index for transmitting the uplink data signal.

The downlink control information may be masked by an identifier associated with a UE group including the plural UEs.

In another aspect of the present invention, provided herein is a user equipment (UE) of a wireless communication system, the UE including a transmit module for transmitting an uplink data signal to a base station (BS), a receive module for receiving downlink control information from the BS, and a processor for processing a signal transmitted to and received from the BS, wherein the processor blind-decodes downlink control information comprising an ACK/NACK response signal of the uplink data signal to acquire decoded information and checks an ACK/NACK response signal corresponding the UE from the downlink control information, and wherein the downlink control information comprises ACK/NACK response signals corresponding to a plurality of UEs.

Advantageous Effects

According to embodiments of the present invention, a base station (BS) in a wireless communication system may effectively transmit a downlink control channel.

It will be appreciated by persons skilled in the art that that the effects that could be achieved with the present invention are not limited to what has been particularly described hereinabove and other advantages of the present invention will be more clearly understood from the following detailed description taken in conjunction with the accompanying drawings.

BEST MODE

The configuration, operation, and other features of the present invention will readily be understood with embodiments of the present invention described with reference to the attached drawings. Embodiments of the present invention as set forth herein are examples in which the technical features of the present invention are applied to a 3rd Generation Partnership Project (3GPP) system.

While embodiments of the present invention are described in the context of Long Term Evolution (LTE) and LTE-Advanced (LTE-A) systems, they are purely exemplary. Therefore, the embodiments of the present invention are applicable to any other communication system as long as the above definitions are valid for the communication system. In addition, while the embodiments of the present invention are described in the context of Frequency Division Duplexing (FDD), they are also readily applicable to Half-FDD (H-FDD) or Time Division Duplexing (TDD) with some modifications.

Figure 1:
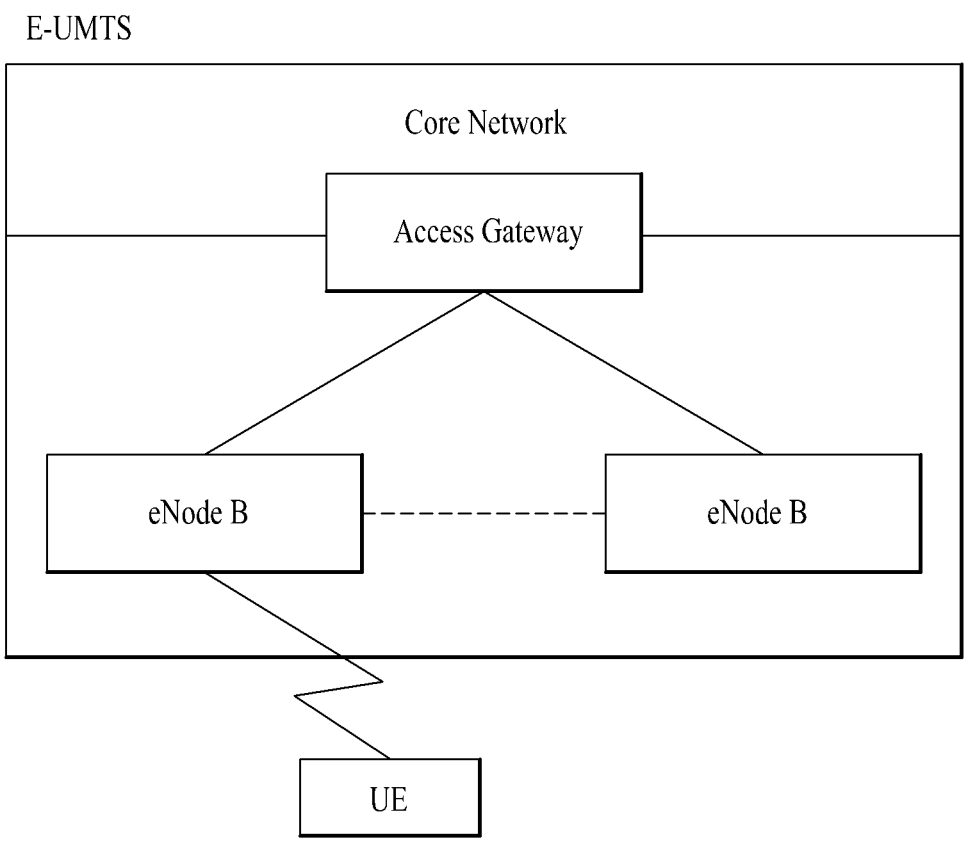
FIG. 1 is a schematic diagram showing a network structure of an evolved universal mobile telecommunications system (E-UMTS) as an example of a wireless communication system.
Figure 2:
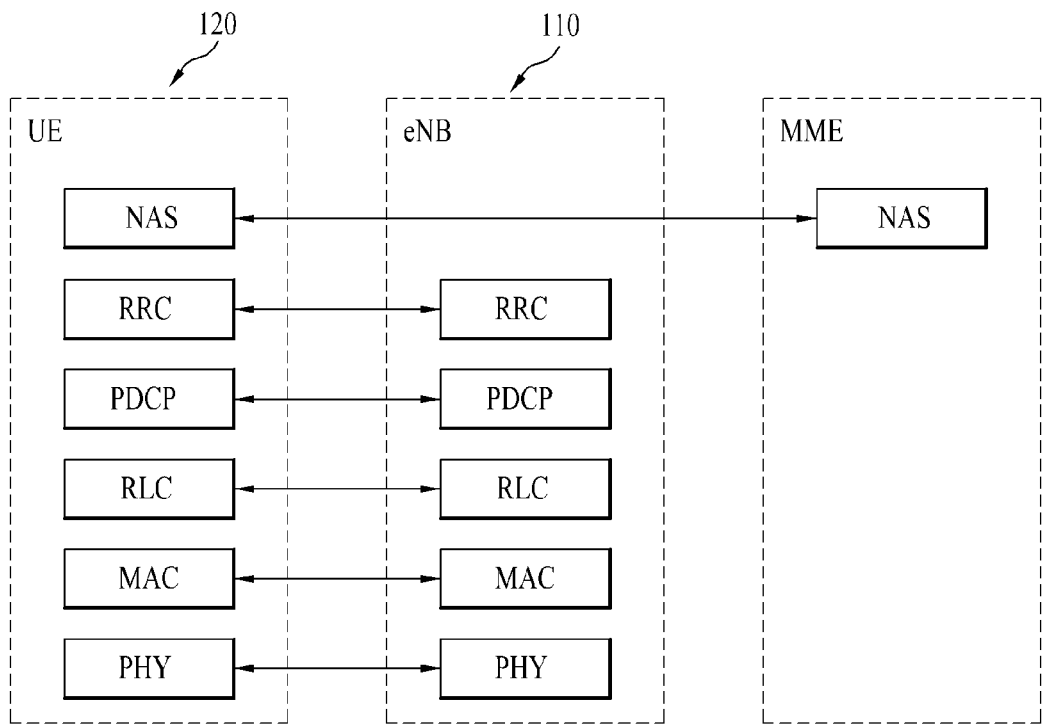
FIG. 2 illustrates control-plane and user-plane protocol stacks in a radio interface protocol architecture conforming to a 3GPP wireless access network standard between a User Equipment (UE) and an Evolved UMTS Terrestrial Radio Access Network (E-UTRAN).
Figure 2:
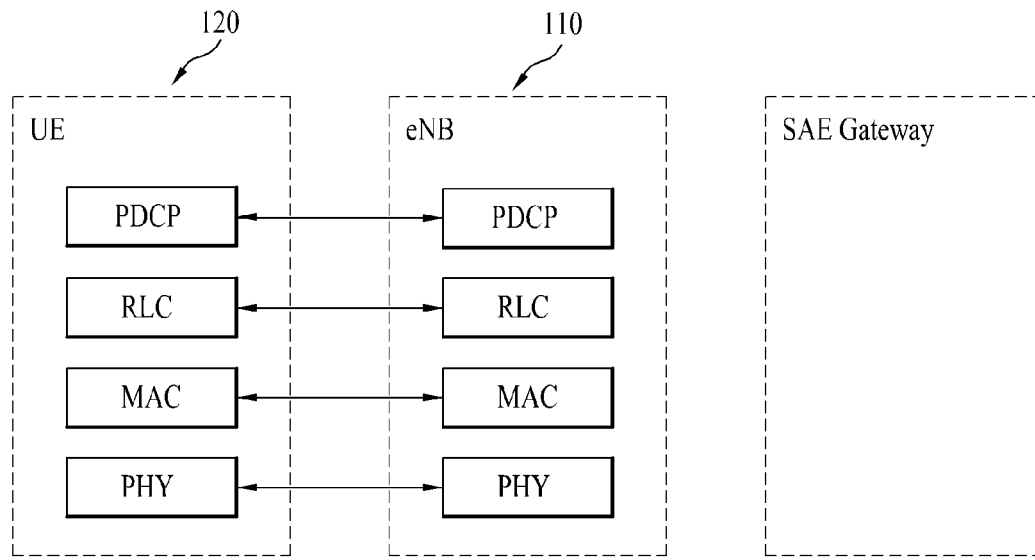

FIG. 2 illustrates control-plane and user-plane protocol stacks in a radio interface protocol architecture conforming to a 3GPP wireless access network standard between a User Equipment (UE) and an Evolved UMTS Terrestrial Radio Access Network (E-UTRAN). The control plane is a path in which the UE and the E-UTRAN transmit control messages to manage calls, and the user plane is a path in which data generated from an application layer, for example, voice data or Internet packet data is transmitted.

A PHYsical (PHY) layer at Layer 1 (L1) provides information transfer service to its higher layer, a Medium Access Control (MAC) layer. The PHY layer is connected to the MAC layer via transport channels. The transport channels deliver data between the MAC layer and the PHY layer. Data is transmitted on physical channels between the PHY layers of a transmitter and a receiver. The physical channels use time and frequency as radio resources. Specifically, the physical channels are modulated in Orthogonal Frequency Division Multiple Access (OFDMA) for downlink and in Single Carrier Frequency Division Multiple Access (SC-FDMA) for uplink.

The MAC layer at Layer 2 (L2) provides service to its higher layer, a Radio Link Control (RLC) layer via logical channels. The RLC layer at L2 supports reliable data transmission. RLC functionality may be implemented in a function block of the MAC layer. A Packet Data Convergence Protocol (PDCP) layer at L2 performs header compression to reduce the amount of unnecessary control information and thus efficiently transmit Internet Protocol (IP) packets such as IP version 4 (IPv4) or IP version 6 (IPv6) packets via an air interface having a narrow bandwidth.

A Radio Resource Control (RRC) layer at the lowest part of Layer 3 (or L3) is defined only on the control plane. The RRC layer controls logical channels, transport channels, and physical channels in relation to configuration, reconfiguration, and release of Radio Bearers (RBs). An RB refers to a service provided at L2, for data transmission between the UE and the E-UTRAN. For this purpose, the RRC layers of the UE and the E-UTRAN exchange RRC messages with each other. If an RRC connection is established between the UE and the E-UTRAN, the UE is in RRC Connected mode and otherwise, the UE is in RRC Idle mode. A Non-Access Stratum (NAS) layer above the RRC layer performs functions including session management and mobility management.

A cell covered by an eNB is set to one of the bandwidths of 1.4, 3, 5, 10, 15, and 20 MHz and provides downlink or uplink transmission service in the bandwidth to a plurality of UEs. Different cells may be set to provide different bandwidths.

Downlink transport channels used to deliver data from the E-UTRAN to UEs include a Broadcast Channel (BCH) carrying system information, a Paging Channel (PCH) carrying a paging message, and a Shared Channel (SCH) carrying user traffic or a control message. Downlink multicast traffic or control messages or downlink broadcast traffic or control messages may be transmitted on a downlink SCH or a separately defined downlink Multicast Channel (MCH). Uplink transport channels used to deliver data from a UE to the E-UTRAN include a Random Access Channel (RACH) carrying an initial control message and an uplink SCH carrying user traffic or a control message. Logical channels that are defined above transport channels and mapped to the transport channels include a Broadcast Control Channel (BCCH), a Paging Control Channel (PCCH), a Common Control Channel (CCCH), a Multicast Control Channel (MCCH), a Multicast Traffic Channel (MTCH), etc.

Figure 3:
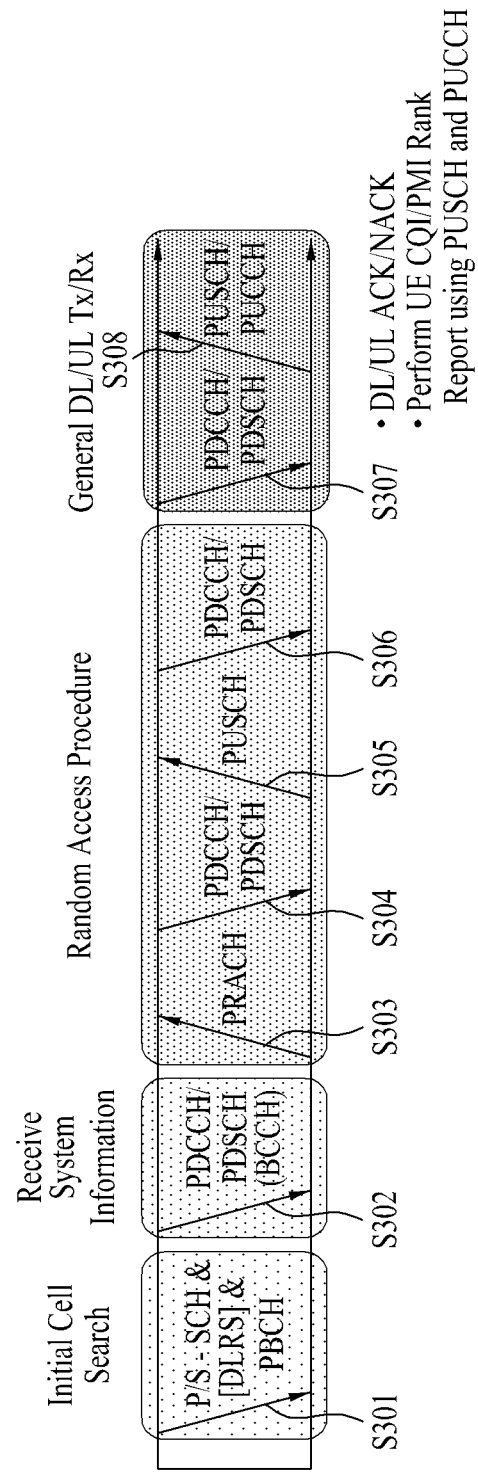
FIG. 3 illustrates physical channels and a general method for transmitting signals on the physical channels in the 3GPP system.

FIG. 3 illustrates physical channels and a general method for transmitting signals on the physical channels in the 3GPP system.

Referring to FIG. 3, when a UE is powered on or enters a new cell, the UE performs initial cell search (S301). The initial cell search involves acquisition of synchronization to an eNB. Specifically, the UE synchronizes its timing to the eNB and acquires a cell Identifier (ID) and other information by receiving a Primary Synchronization Channel (P-SCH) and a Secondary Synchronization Channel (S-SCH) from the eNB. Then the UE may acquire information broadcast in the cell by receiving a Physical Broadcast Channel (PBCH) from the eNB. During the initial cell search, the UE may monitor a downlink channel state by receiving a DownLink Reference Signal (DL RS).

After the initial cell search, the UE may acquire detailed system information by receiving a Physical Downlink Control Channel (PDCCH) and receiving a Physical Downlink Shared Channel (PDSCH) based on information included in the PDCCH (S302).

If the UE initially accesses the eNB or has no radio resources for signal transmission to the eNB, the UE may perform a random access procedure with the eNB (S303 to S306). In the random access procedure, the UE may transmit a predetermined sequence as a preamble on a Physical Random Access Channel (PRACH) (S303 and S305) and may receive a response message to the preamble on a PDCCH and a PDSCH associated with the PDCCH (S304 and S306). In case of a contention-based RACH, the UE may additionally perform a contention resolution procedure.

After the above procedure, the UE may receive a PDCCH and/or a PDSCH from the eNB (S307) and transmit a Physical Uplink Shared Channel (PUSCH) and/or a Physical Uplink Control Channel (PUCCH) to the eNB (S308), which is a general downlink and uplink signal transmission procedure. Particularly, the UE receives Downlink Control Information (DCI) on a PDCCH. Herein, the DCI includes control information such as resource allocation information for the UE. Different DCI formats are defined according to different usages of DCI.

Control information that the UE transmits to the eNB on the uplink or receives from the eNB on the downlink includes a DL/UL ACKnowledgment/Negative ACKnowledgment (ACK/NACK) signal, a Channel Quality Indicator (CQI), a Precoding Matrix Index (PMI), a Rank Indicator (RI), etc. In the 3GPP LTE system, the UE may transmit control information such as a CQI, a PMI, an RI, etc. on a PUSCH and/or a PUCCH.

Now a description will be given of a multiple input multiple output (MIMO) system. MIMO can increase the transmission and reception efficiency of data by using a plurality of transmission (Tx) antennas and a plurality of reception (Rx) antennas. That is, with the use of multiple antennas at a transmitter or a receiver, MIMO can increase capacity and improve performance in a wireless communication system. The term "MIMO" is interchangeable with "multi-antenna".

The MIMO technology does not depend on a single antenna path to receive a whole message. Rather, it completes the message by combining data fragments received through a plurality of antennas. MIMO can increase data rate within a cell area of a predetermined size or extend system coverage at a given data rate. In addition, MIMO can retrieve its use in a wide range including mobile terminals, relays, etc. MIMO can overcome a limited transmission capacity encountered with the conventional single-antenna technology in mobile communication.

Figure 4:
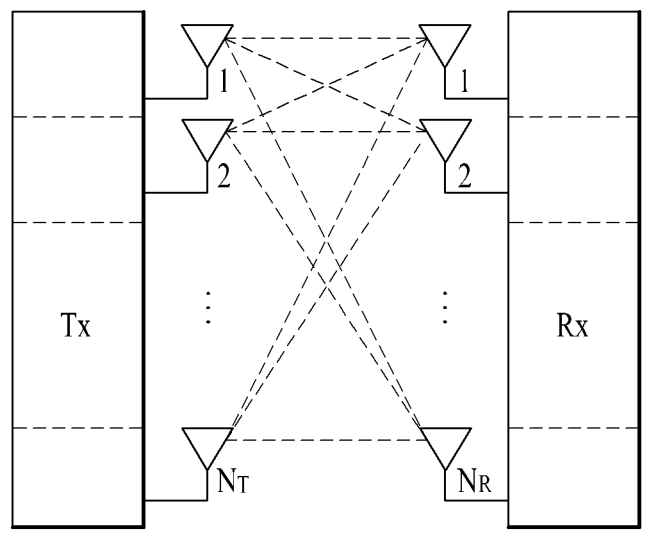
FIG. 4 illustrates the configuration of a typical MIMO communication system.

FIG. 4 illustrates the configuration of a typical MIMO communication system. Referring to FIG. 4, a transmitter has $N_T$ Tx antennas and a receiver has $N_R$ Rx antennas. The simultaneous use of a plurality of antennas at both the transmitter and the receiver increases a theoretical channel transmission capacity, compared to use of a plurality of antennas at only one of the transmitter and the receiver. The channel transmission capacity increases in proportion to the number of antennas. Therefore, transmission rate and frequency efficiency are increased. Given a maximum transmission rate $R_o$ that may be achieved with a single antenna, the transmission rate may be increased, in theory, to the product of $R_o$ and a transmission rate increase rate $R_i$ in the case of multiple antennas, according to Equation 1 below. $R_i$ is the smaller value between $N_T$ and $N_R$.

$$R_i = \min(N_T, N_R) \qquad \text{[Equation 1]}$$

For instance, a MIMO communication system with four Tx antennas and four Rx antennas may achieve a four-fold increase in transmission rate theoretically, relative to a single-antenna system. Since the theoretical capacity increase of the MIMO system was verified in the middle 1990s, many techniques have been actively proposed to increase data rate in real implementation. Some of the techniques have already been reflected in various wireless communication standards for 3G mobile communications, next-generation wireless local area network (WLAN), etc.

Concerning the research trend of MIMO up to now, active studies are underway in many respects of MIMO, inclusive of studies of information theory related to calculation of multi-antenna communication capacity in diverse channel environments and multiple access environments, studies of measuring MIMO radio channels and MIMO modeling, studies of time-space signal processing techniques to increase transmission reliability and transmission rate, etc.

Figure 7:
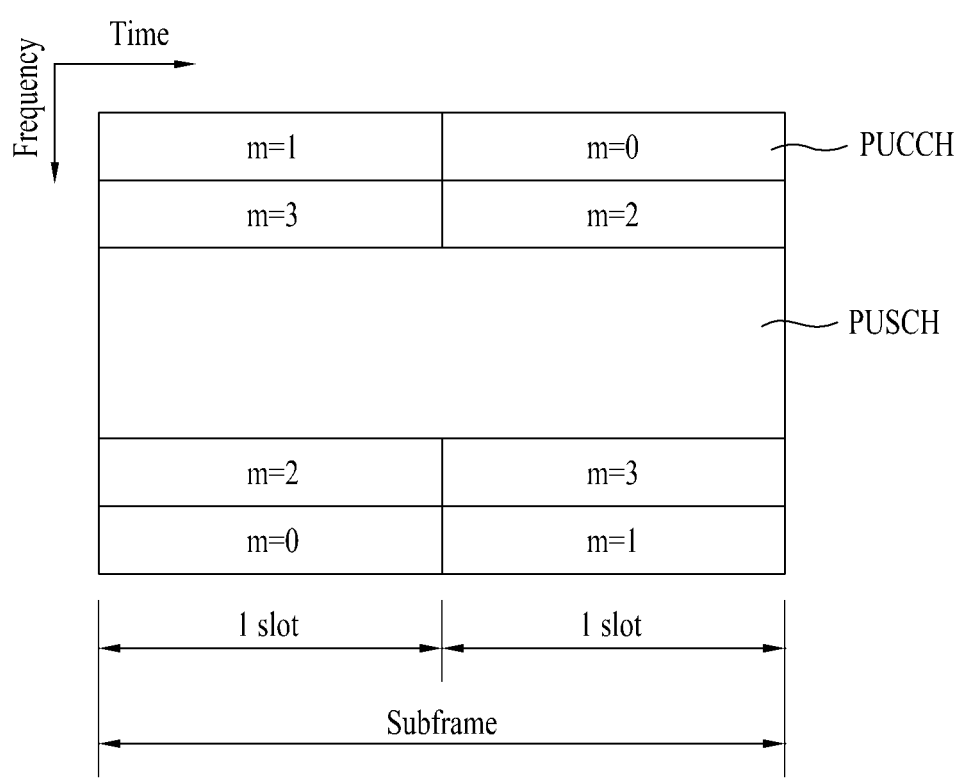
FIG. 7 illustrates a structure of a UL subframe in the LTE system.

Communication in a MIMO system with $N_T$ Tx antennas and $N_R$ Rx antennas as illustrated in FIG. 7 will be described in detail through mathematical modeling. Regarding a transmission signal, up to $N_T$ pieces of information can be transmitted through the $N_T$ Tx antennas, as expressed as the vector of Equation 2.

$$s = [s_1, s_2, \ldots, s_{N_T}]^T \qquad \text{[Equation 2]}$$

A different transmission power may be applied to each piece of transmission information, $s_1, s_2, \ldots, s_{N_T}$. Let the transmission power levels of the transmission information be denoted by $P_1, P_2, \ldots, P_{N_T}$, respectively. Then the transmission power-controlled transmission information vector is given according to Equation 3 below.

$$\hat{s}=[\hat{s}_1, \hat{s}_2, \ldots, \hat{s}_{N_T}]^T=[P_1s_1, P_2s_2, \ldots, P_{N_T}s_{N_T}]^T \quad \text{[Equation 3]}$$

The transmission power-controlled transmission information vector $\hat{s}$ may be expressed according to Equation 4 below, using a diagonal matrix $P$ of transmission power.

$$\hat{s} = \begin{bmatrix} P_1 & & 0 \\ & P_2 & \\ & & \ddots \\ 0 & & P_{N_T} \end{bmatrix} \begin{bmatrix} s_1 \\ s_2 \\ \vdots \\ s_{N_T} \end{bmatrix} = Ps \quad \text{[Equation 4]}$$

$N_T$ transmission signals $x_1, x_2, \ldots, x_{N_T}$ may be generated by multiplying the transmission power-controlled information vector $\hat{s}$ by a weight matrix $W$. The weight matrix $W$ functions to appropriately distribute the transmission information to the Tx antennas according to transmission channel states, etc. These $N_T$ transmission signals $x_1, x_2, \ldots, x_{N_T}$ are represented as a vector $x$, which may be determined according to Equation 5 below. Here, $w_{ij}$ denotes a weight between a $j^{th}$ piece of information and an $i^{th}$ Tx antenna and $W$ is referred to as a weight matrix or a precoding matrix.

$$x = \begin{bmatrix} x_1 \\ x_2 \\ \vdots \\ x_i \\ \vdots \\ x_{N_T} \end{bmatrix} = \begin{bmatrix} w_{11} & w_{12} & \cdots & w_{1N_T} \\ w_{21} & w_{22} & \cdots & w_{2N_T} \\ \vdots & & \ddots & \\ w_{i1} & w_{i2} & \cdots & w_{iN_T} \\ \vdots & & \ddots & \\ w_{N_T1} & w_{N_T2} & \cdots & w_{N_TN_T} \end{bmatrix} \begin{bmatrix} \hat{s}_1 \\ \hat{s}_2 \\ \vdots \\ \hat{s}_J \\ \vdots \\ \hat{s}_{N_T} \end{bmatrix} = W\hat{s} = WPs \quad \text{[Equation 5]}$$

In general, the rank of a channel matrix is the maximum number of different pieces of information that can be transmitted on a given channel, in its physical meaning. Therefore, the rank of a channel matrix is defined as the smaller between the number of independent rows and the number of independent columns in the channel matrix. The rank of the channel matrix is not larger than the number of rows or columns of the channel matrix. The rank of a channel matrix $H$, rank($H$) satisfies the following constraint according to Equation 6 below.

$$\text{rank}(H) \le \min(N_T, N_R) \quad \text{[Equation 6]}$$

A different piece of information transmitted in MIMO is referred to as 'transmission stream' or shortly 'stream'. The 'stream' may also be called 'layer'. It is thus concluded that the number of transmission streams is not larger than the rank of channels, i.e. the maximum number of different pieces of transmittable information. Thus, the channel matrix $H$ is determined according to Equation 7 below.

$$\text{\# of streams} \le \text{rank}(H) \le \min(N_T, N_R) \quad \text{[Equation 7]}$$

"# of streams" denotes the number of streams. One thing to be noted here is that one stream may be transmitted through one or more antennas.

One or more streams may be mapped to a plurality of antennas in many ways. The stream-to-antenna mapping may be described as follows depending on MIMO schemes. If one stream is transmitted through a plurality of antennas, this may be regarded as spatial diversity. When a plurality of streams is transmitted through a plurality of antennas, this may be spatial multiplexing. Needless to say, a hybrid scheme of spatial diversity and spatial multiplexing in combination may be contemplated.

Figure 5:
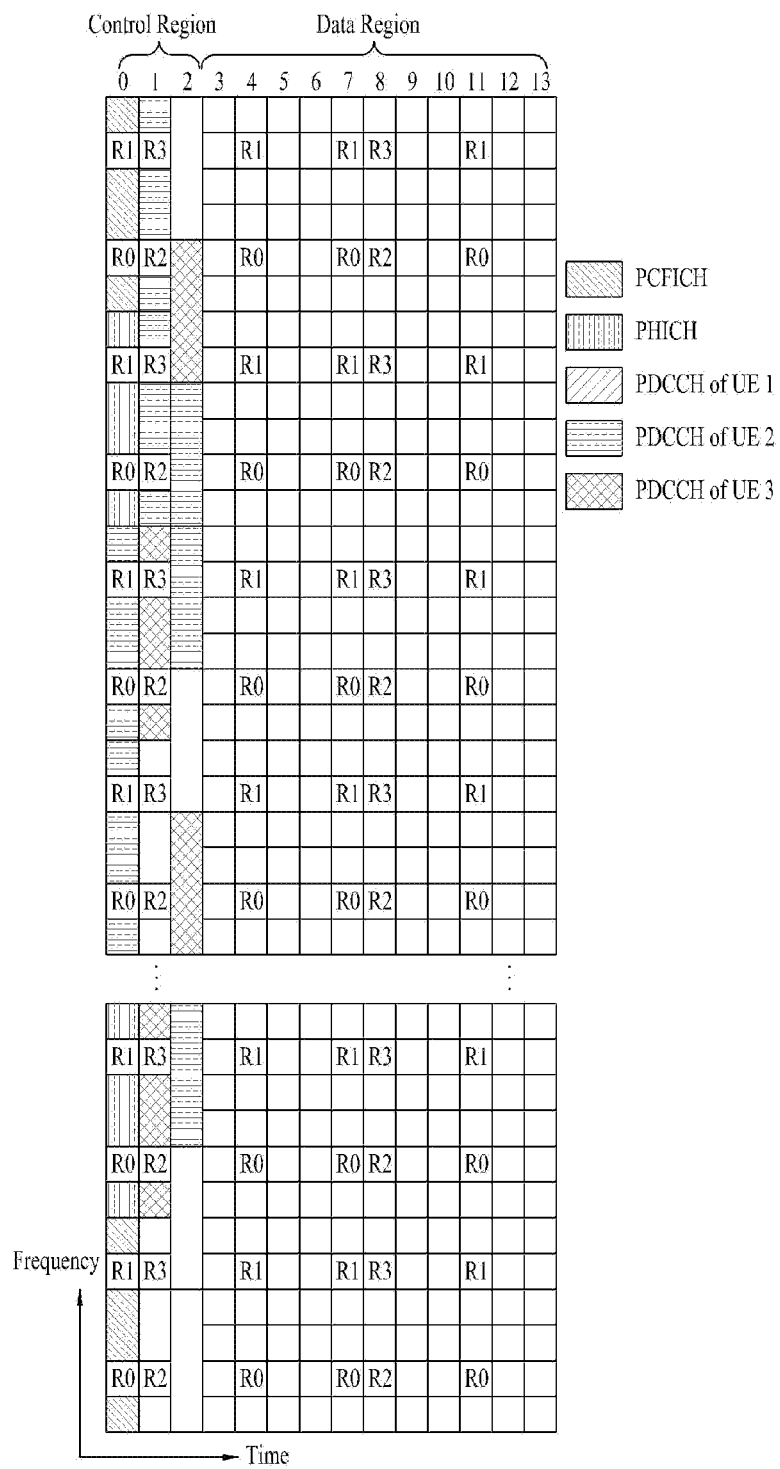
FIG. 5 illustrates exemplary control channels included in a control region of a subframe in a DL radio frame.

FIG. 5 illustrates exemplary control channels included in the control region of a subframe in a DL radio frame.

Referring to FIG. 5, a subframe includes 14 OFDM symbols. The first one to three OFDM symbols of a subframe are used for a control region and the other 13 to 11 OFDM symbols are used for a data region according to a subframe configuration. In FIG. 5, reference characters R1 to R4 denote RSs or pilot signals for antenna 0 to antenna 3. RSs are allocated in a predetermined pattern in a subframe irrespective of the control region and the data region. A control channel is allocated to non-RS resources in the control region and a traffic channel is also allocated to non-RS resources in the data region. Control channels allocated to the control region include a Physical Control Format Indicator Channel (PCFICH), a Physical Hybrid-ARQ Indicator Channel (PHICH), a Physical Downlink Control Channel (PDCCH), etc.

The PCFICH is a physical control format indicator channel carrying information about the number of OFDM symbols used for PDCCHs in each subframe. The PCFICH is located in the first OFDM symbol of a subframe and configured with priority over the PHICH and the PDCCH. The PCFICH is composed of 4 Resource Element Groups (REGs), each REG being distributed to the control region based on a cell Identity (ID). One REG includes 4 Resource Elements (REs). An RE is a minimum physical resource defined by one subcarrier by one OFDM symbol. The PCFICH indicates 1 to 3 or 2 to 4 according to a bandwidth. The PCFICH is modulated in Quadrature Phase Shift Keying (QPSK).

The PHICH is a physical Hybrid-Automatic Repeat and request (HARQ) indicator channel carrying an HARQ ACK/NACK for an uplink transmission. That is, the PHICH is a channel that delivers DL ACK/NACK information for UL HARQ. The PHICH includes one REG and is scrambled cell-specifically. An ACK/NACK is indicated in one bit and modulated in Binary Phase Shift Keying (BPSK). The modulated ACK/NACK is spread with a Spreading Factor (SF) of 2 or 4. A plurality of PHICHs mapped to the same resources form a PHICH group. The number of PHICHs multiplexed into a PHICH group is determined according to the number of spreading codes. A PHICH (group) is repeated three times to obtain a diversity gain in the frequency domain and/or the time domain.

The PDCCH is a physical downlink control channel allocated to the first n OFDM symbols of a subframe. Herein, n is 1 or a larger integer indicated by the PCFICH. The PDCCH is composed of one or more CCEs. The PDCCH carries resource allocation information about transport channels, PCH and DL-SCH, an uplink scheduling grant, and HARQ information to each UE or UE group. The PCH and the DL-SCH are transmitted on a PDSCH. Therefore, an eNB and a UE transmit and receive data usually on the PDSCH, except for specific control information or specific service data.

Information indicating one or more UEs to receive PDSCH data and information indicating how the UEs are supposed to receive and decode the PDSCH data are delivered on a PDCCH. For example, on the assumption that Cyclic Redundancy Check (CRC) of a specific PDCCH is masked by Radio Network Temporary Identity (RNTI) "A"

and information about data transmitted in radio resources (e.g. at a frequency position) "B" based on transport format information (e.g. a transport block size, a modulation scheme, coding information, etc.) "C" is transmitted in a specific subframe, a UE within a cell monitors, that is, blind-decodes a PDCCH using its RNTI information in a search space. If one or more UEs have RNTI "A", these UEs receive the PDCCH and receive a PDSCH indicated by "B" and "C" based on information of the received PDCCH.

Figure 6:
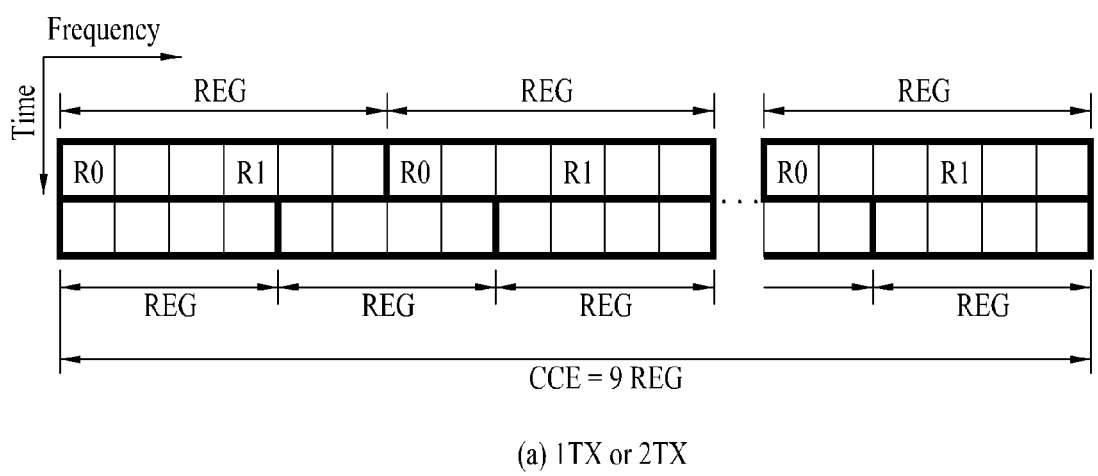
FIG. 6 illustrates resource units used to configure a DL control channel in an LTE system.
Figure 6:
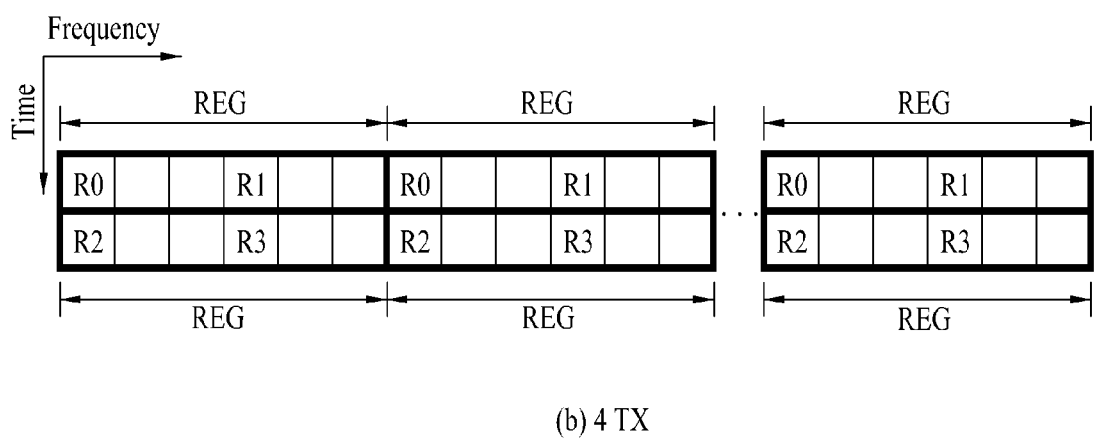

FIG. 6 illustrates resource units used to configure a DL control channel in an LTE system. Specifically, FIG. 6(a) illustrates resource units used to configure a DL control channel, when the number of transmission (Tx) antennas in an eNB is 1 or 2 and FIG. 6(b) illustrates resource units used to configure a DL control channel, when the number of Tx antennas in an eNB is 4. Although a different reference signal (RS) pattern is used according to the number of Tx antennas, resources unit related to a control channel are configured in the same manner.

Referring to FIG. 6, a basic resource unit of a control channel is an REG. An REG includes 4 contiguous resource elements (REs) except for REs used for RSs. A bold square represents an REG in FIG. 6. A PCFICH and a PHICH include 4 REGs and 3 REGs, respectively. A PDCCH is composed of control channel elements (CCE), each CCE including 9 REGs.

To determine whether a PDCCH having L CCEs is destined for a UE, the UE is configured to monitor $M^{(L)}(\geq L)$ CCRs which are contiguous or arranged in a specific rule. The UE may consider plural L values, for PDCCH reception. CCE sets that the UE should monitor for PDCCH reception are called a search space. For example, search spaces are defined as illustrated in Table 1 below in the LTE system.

TABLE 1

| Type | Search space $S_k^{(L)}$ | | Number of PDCCH candidates $M^{(L)}$ | DCI formats |
|---|---|---|---|---|
| | Aggregation level L | Size [in CCEs] | | |
| UE-specific | 1 | 6 | 6 | 0, 1, 1A, 2B, 1D, 2, 2A, 2B, 4 |
| | 2 | 12 | 6 | |
| | 4 | 8 | 2 | |
| | 8 | 16 | 2 | |
| Common | 4 | 16 | 4 | 0, 1A, 1C, 3/3A |
| | 8 | 16 | 2 | |

CCE aggregation level, L is the number of CCEs in a PDCCH, $S_k^{(L)}$ represents a search space of CCE aggregation level L, and $M^{(L)}$ is the number of PDCCH candidates to be monitored in a search space with CCE aggregation level L.

Search spaces may be classified into a UE-specific search space accessible only to a specific UE and a common search space accessible to all UEs. A UE monitors common search spaces with CCE aggregation levels 4 and 8 and UE-specific search spaces with CCE aggregation levels 1, 2, 4, and 8. The common search spaces may be overlapped with the UE-specific search spaces.

The position of a first CCE (i.e. a CCE with a lowest index) in a PDCCH search space assigned to a UE, for each CCE aggregation level is changed in every subframe. This is called PDCCH search space hashing.

The CCE may be distributed across a system band. In detail, a plurality of logically contiguous CCEs is input to an interleaver. The interleaver permutes the sequence of the plurality of input CCEs on an REG basis. Accordingly, the time/frequency resources of one CCE are physically distributed to a total time/frequency area in the control region of a subframe. As a consequence, while the control channel is configured on a CCE basis, it is interleaved on an REG basis, thereby maximizing a frequency diversity and an interference randomization gain.

FIG. 7 illustrates a structure of a UL subframe in the LTE system.

Referring to FIG. 7, a UL subframe may be divided into a control region and a data region. A Physical Uplink Control Channel (PUCCH) including Uplink Control Information (UCI) is allocated to the control region and a Physical uplink Shared Channel (PUSCH) including user data is allocated to the data region. The middle of the subframe is allocated to the PUSCH, while both sides of the data region in the frequency domain are allocated to the PUCCH. Control information transmitted on the PUCCH may include an HARQ ACK/NACK, a CQI representing a downlink channel state, an RI for Multiple Input Multiple Output (MIMO), a Scheduling Request (SR) requesting UL resource allocation. A PUCCH for one UE occupies one Resource Block (RB) in each slot of a subframe. That is, the two RBs allocated to the PUCCH frequency-hop over the slot boundary of the subframe. Particularly, PUCCHs with m=0, m=1, and m=2 are allocated to a subframe in FIG. 6.

In a current wireless communication environment, data demands relative to a cellular network are rapidly rising due to the advent and supply of various devices that demand machine-to-machine (M2M) communication and a high data transmission capacity. To satisfy the high data demands, communication technology such as carrier aggregation technology, etc., has been developed for effective use of more frequency bands and multi-antenna technology, multiple base station cooperation technology, etc. has been developed for increase in data capacity in a limited frequency. In addition, a communication environment has evolved toward a tendency that a density of accessible nodes around a user is increasing. A system including a node having this high density can achieve higher system performance using cooperation between nodes. According to this method, nodes respectively operates as a base station (BS), an advanced BS (ABS), a node-B (NB), eNode-B (eNB), an access point (AP), etc., which are independent of each other, to achieve excellent performance compared to a case without cooperation.

Figure 8:
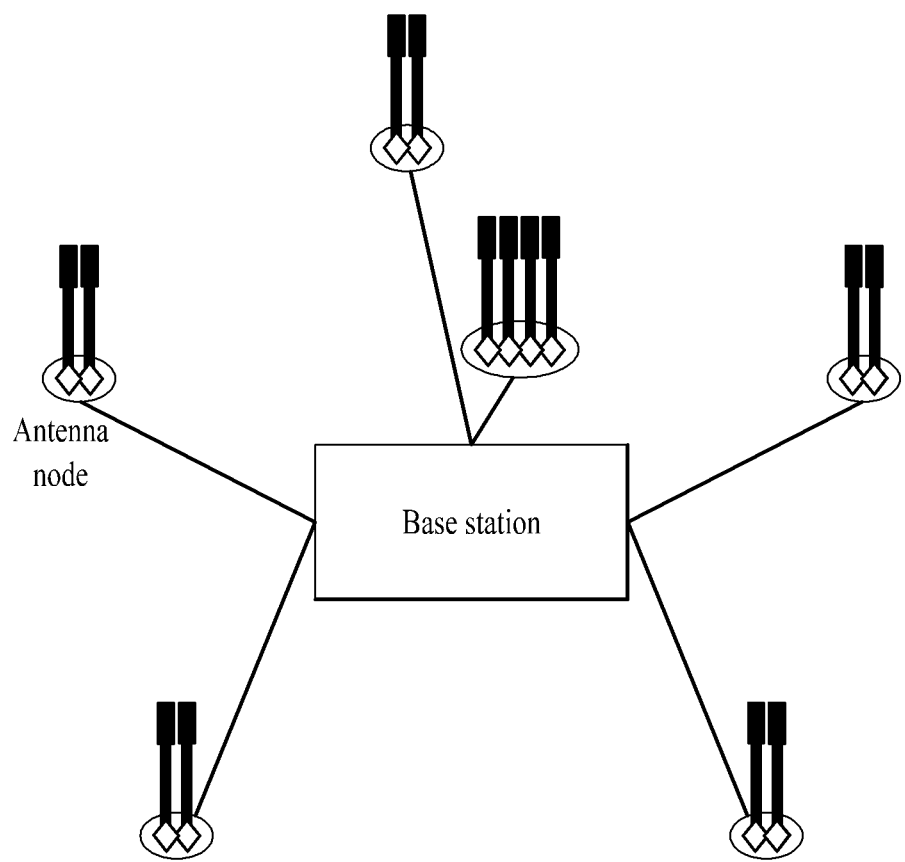
FIG. 8 is a diagram illustrating a multi-node system in a next-generation communication system.

FIG. 8 is a diagram illustrating a multi-node system in a next-generation communication system.

Referring to FIG. 8, if the system is configured in such a way that transmission and reception of all nodes are managed by one controller and each node operates as some antenna group included in one cell, the system may be a distributed multi node system (DMNS) constituting one cell. In this case, the nodes may be assigned respective node identifiers (IDs) or may operate as some antennas included in the cell without separate node IDs. However, when nodes have respective different cell IDs, the system may be a multi-cell system. When multiple cells overlap according to coverage, the system is called a multi-tier network.

A node-B, an eNode-B, a PeNB, an HeNB, a remote radio head (RRH), a relay, a distributed antenna, etc. may be a node and a minimum of one antenna is installed per node. The node may also be called a transmission point. Although the node usually refers to an antenna group in which antennas are spaced apart from each other by a predetermined interval or more, the present invention can be applied to an arbitrary antenna group irrespective of intervals.

According to the advent of the aforementioned multi-node system and relay node, it may be possible to apply various communication schemes to improve channel quality. However, in order to apply the aforementioned MIMO scheme and inter-cell cooperative communication scheme to a multiple node environment, there is a need to introduce a new control channel. The new control channel being discussed due to this need is an enhanced-PDCCH (E-PDCCH) and is determined to be allocated to a data region (hereinafter, referred to as a 'PDSCH region') instead of an existing control region (hereinafter, referred to as a 'PDCCH region'). In conclusion, it may be possible to transmit control information of a node per UE through the E-PDCCH and thus the problem in terms of the existing insufficient PDCCH region can also be overcome. For reference, the E-PDCCH may not be provided to the legacy UE but may be received by an LTE-A UE only.

Figure 9:
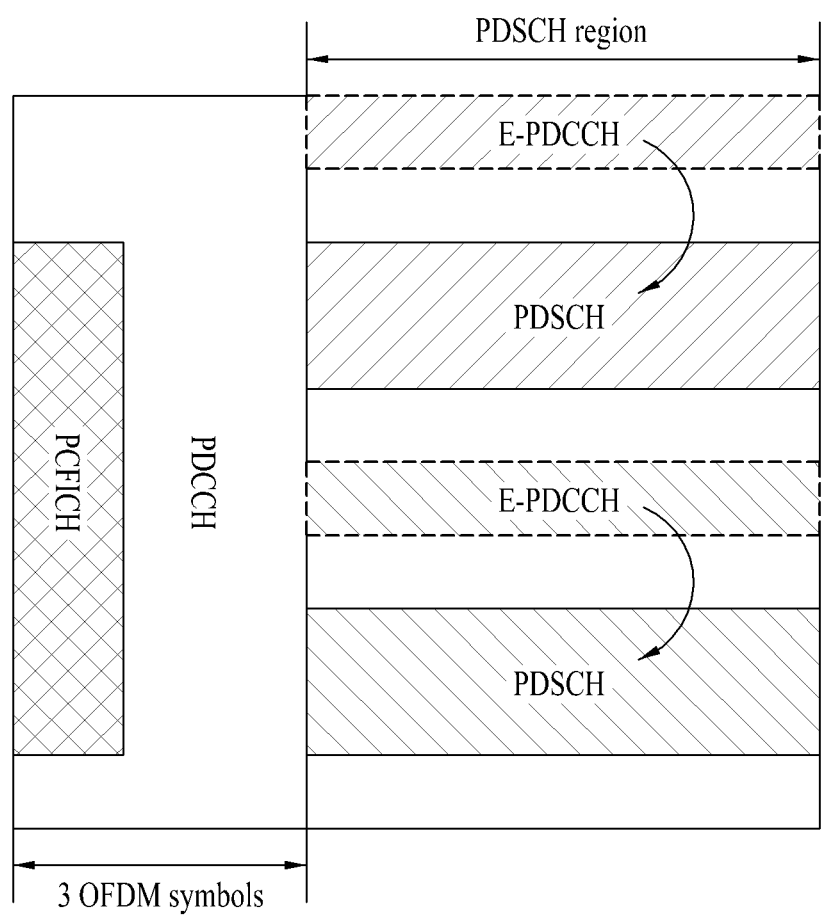
FIG. 9 is a diagram illustrating a PDSCH that is scheduled by an E-PDCCH and an E-PDCCH.

FIG. 9 is a diagram illustrating a PDSCH that is scheduled by an E-PDCCH and an E-PDCCH.

Referring to FIG. 9, the E-PDCCH may usually be defined and used as a portion of a PDSCH region for transmitting data and a UE needs to perform a blind decoding procedure to detect whether the E-PDCCH of the UE is present. The E-PDCCH performs the same scheduling operation (that is, PDSCH and PUSCH control) as an existing PDCCH. However, as the number of UEs that access the same node as the RRH is increased, a higher number of E-PDCCHs are allocated to the PDSCH region. Accordingly, the number of times of blind decoding supposed to be performed by the UE is increased, thereby increasing complexity.

Hereinafter, the PHICH will be described below in more detail. When data is transmitted in downlink of an OFDM wireless packet communication system, a channel for transmitting ACK/NACK signals is defined as a physical hybrid ARQ indicator channel (PHICH). A plurality of PHICHs mapped to the same resource element set may constitute a PHICH group and may be differentiated by an orthogonal sequence.

PHICH resource may be identified by an index pair ($n_{PHICH}^{group}, n_{PHICH}^{seq}$), $n_{PHICH}^{group}$ refers to a PHICH group index, and $n_{PHICH}^{seq}$ refers to an index of the orthogonal sequence applied to the corresponding PHICH group.

The number of PHICH groups in an FDD system may be constant in all subframes and may be determined according to Equation 8 below.

$$N_{PHICH}^{group} = \begin{cases} \lceil N_g(N_{RB}^{DL}/8) \rceil & \text{for normal cyclic prefix} \\ 2 \cdot \lceil N_g(N_{RB}^{DL}/8) \rceil & \text{for extended cyclic prefix} \end{cases} \quad \text{[Equation 8]}$$

Here, $N_g$ is obtained via signaling in a higher layer and is determined according to $N_g \in \{1/6, 1/2, 1, 2\}$. The UE may set the number of PHICH groups using $N_g$ and $N_{RB}^{DL}$.

In addition, elements $n_{PHICH}^{group}$ and $n_{PHICH}^{seq}$ of the index pair ($n_{PHICH}^{group}, n_{PHICH}^{seq}$) are determined according to Equation 9 below.

$$n_{PHICH}^{group} = (I_{PRB\_RA} + n_{DMRS}) \bmod N_{PHICH}^{group} + I_{PHICH} N_{PHICH}^{group}$$

$$n_{PHICH}^{seq} = (\lfloor I_{PRB\_RA}/N_{PHICH}^{group} \rfloor + n_{DMRS}) \bmod 2N_{SF}^{PHICH} \quad \text{[Equation 9]}$$

In Equation 8 above, $n_{DMRS}$ is included UL grant for PUSCH transmission associated with the corresponding PHICH and $N_{SF}^{PHICH}$ refers to a size of a spreading factor used for PHICH modulation.

In addition, $I_{PHICH}$ is defined according to Equation 10 below. That is, $I_{PHICH}$ is 0 in a general FDD system.

$$I_{PHICH} = \begin{cases} 1 & \text{for TDD UL/DL configuration 0 with} \\ & \text{PUSCH transmission in subframe } n = 4 \text{ or } 9 \\ 0 & \text{otherwise} \end{cases} \quad \text{[Equation 10]}$$

Lastly, $I_{PRB\_RA}$ is defined according to Equation 11 below.

$$I_{PRB\_RA} = \begin{cases} I_{PRB\_RA}^{lowest\_index} & \begin{array}{l}\text{for the first TB of a PUSCH with associated} \\ \text{PDCCH or for the case of no associated} \\ \text{PDCCH when the number of negatively} \\ \text{acknowledged TBs is not equal to the number} \\ \text{of TBs indicated in the most recent PDCCH} \\ \text{associated with the corresponding PUSCH}\end{array} \\ I_{PRB\_RA}^{lowest\_index} + 1 & \text{for a second TB of a PUSCH with associated PDCCH} \end{cases} \quad \text{[Equation 11]}$$

Considering various types of communication schemes that will be developed later, there is a need for correction of a legacy LTE-A based control channel or a new control channel.

Figure 10:
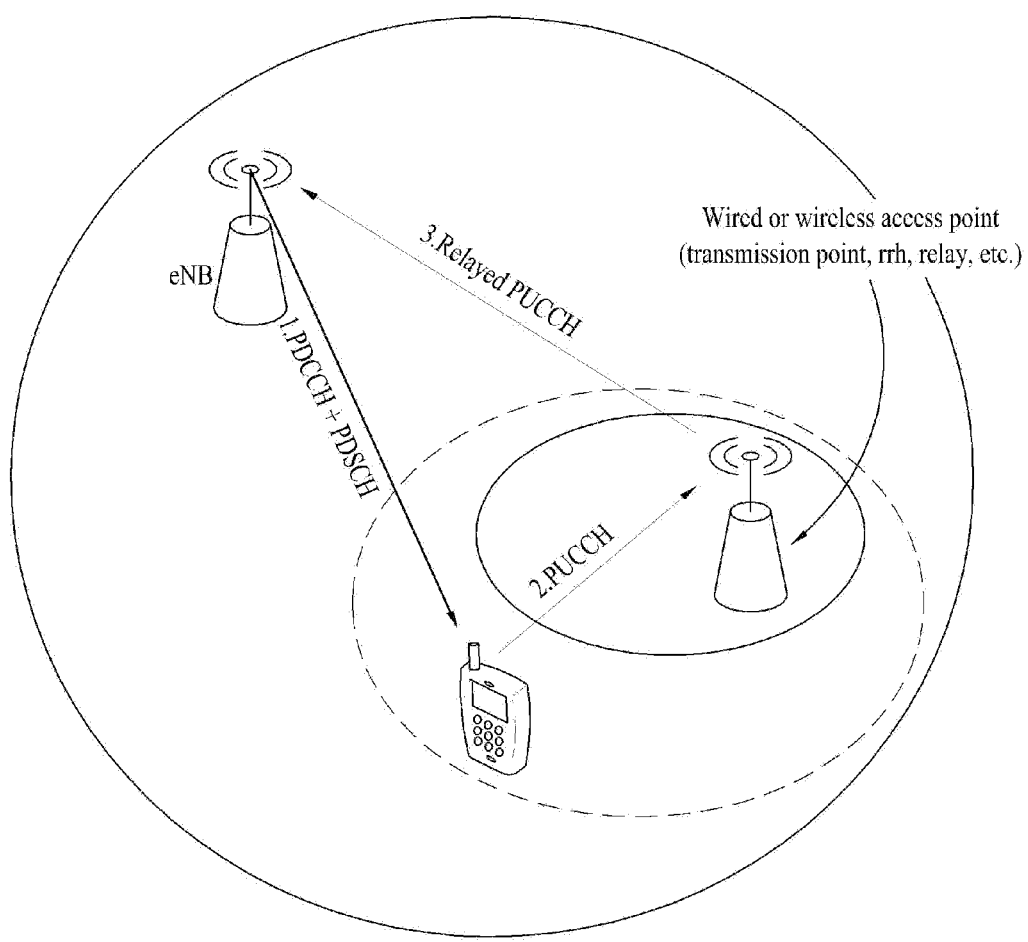
FIGS. 10 and 11 are diagrams illustrating a system in which DL transmission and UL transmission are performed in different ells.
Figure 11:
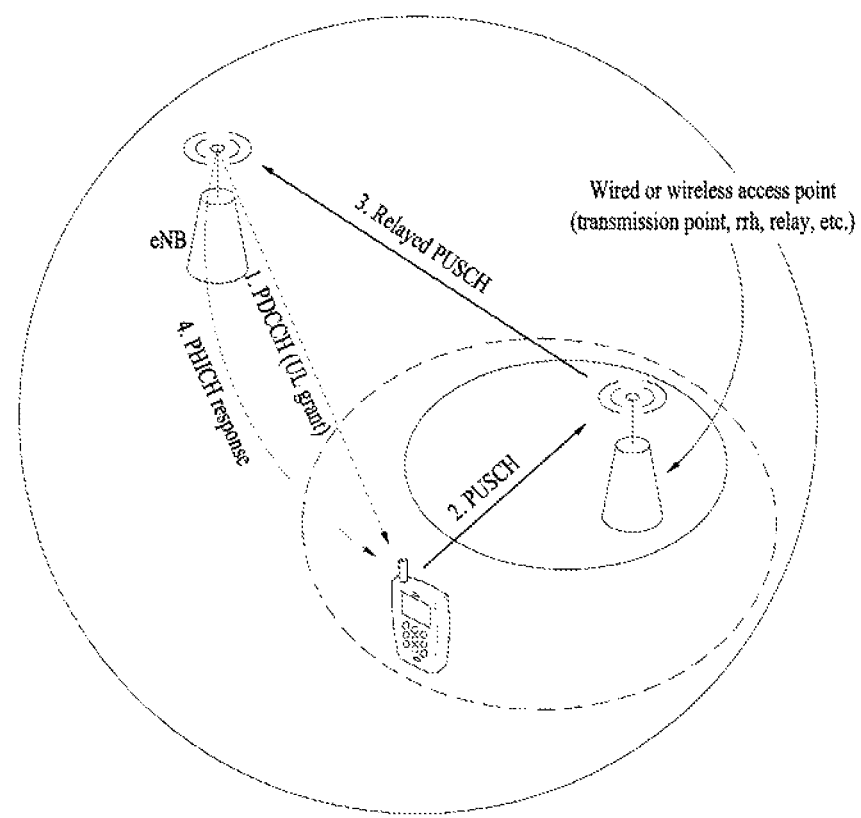

FIGS. 10 and 11 are diagrams illustrating a system in which DL transmission and UL transmission are performed in different ells. Here, a secondary serving cell may be, for example, a wired or wireless access point (transmission point, RRH, relay, etc.) and may be allocated with the same cell ID as the primary serving cell or a different cell ID from the primary serving cell.

FIG. 10 illustrates an example in which a PDCCH and a PDSCH are received from the primary serving cell and a PUCCH is transmitted to the secondary serving cell. In addition, FIG. 11 illustrates an example in which a PDCCH is received from the primary serving cell, a PUSCH is transmitted to the secondary serving cell, and a PHICH is received from the primary serving cell in response thereto.

Figure 12:
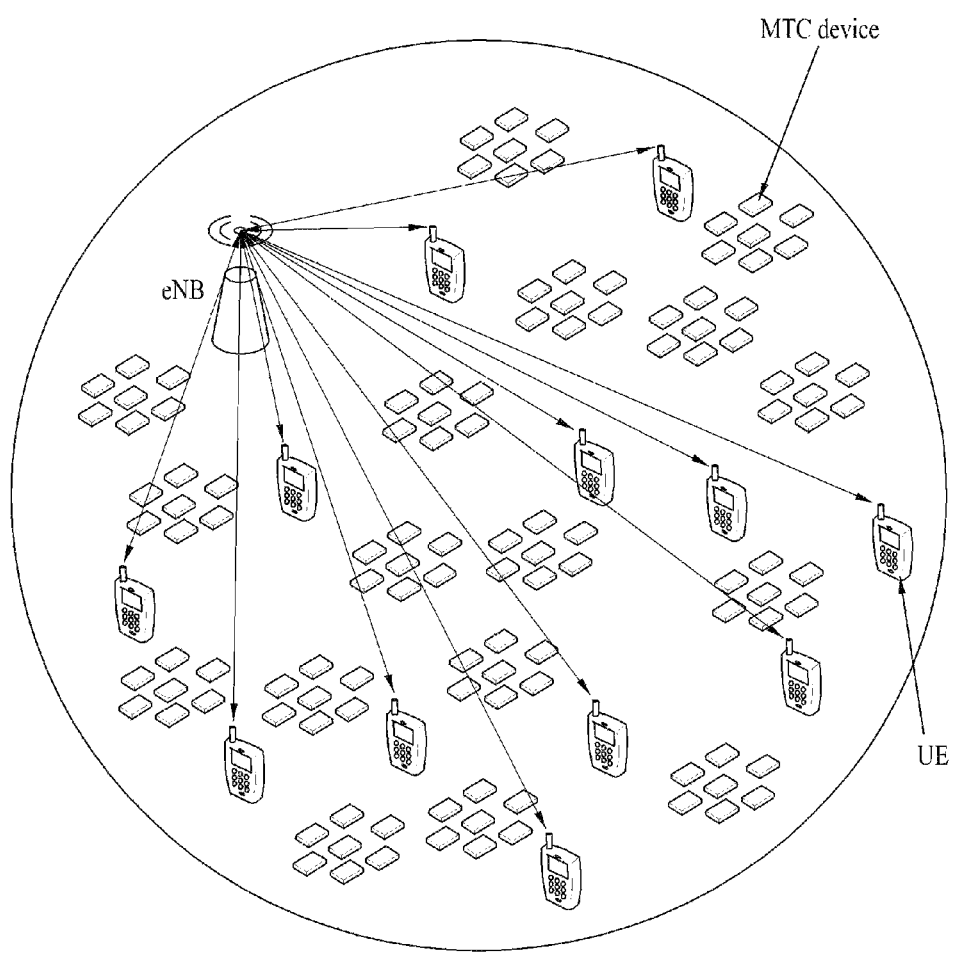
FIG. 12 is a diagram for explanation of problems of conventional art.

In particular, a system that operates as in FIG. 11 frequently requires additional PHICH resources as well as existing PHICH resources. For example, as in FIG. 12, when a much higher number of machine type communication (MTC) UEs than legacy UEs are present, this situation cannot be sufficiently handled using the conventionally designed control channel.

The present invention proposes various methods for overcoming problems in terms of insufficient PHICH resources in the aforementioned situation.

<First Embodiment>

Figure 13:
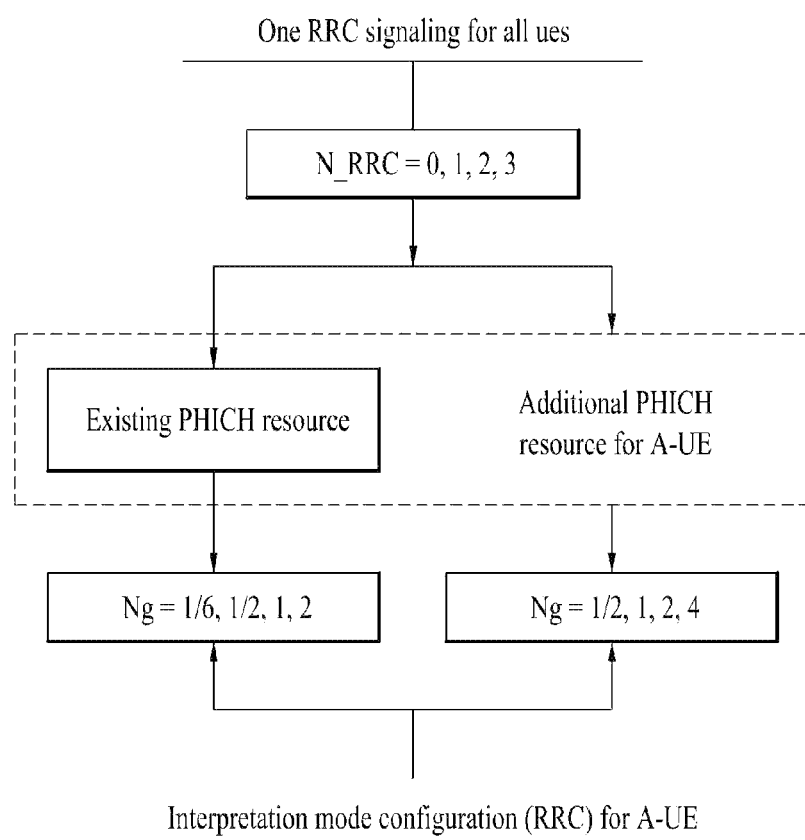
FIG. 13 is a diagram of a method of configuring PHICH resource according to a first embodiment of the present invention.

FIG. 13 is a diagram of a method of configuring PHICH resource according to a first embodiment of the present invention.

In particular, referring to FIG. 13, the present invention proposes a method in which a legacy UE, which can receive only an existing PHICH, and an advanced-UE (A-UE), which can receive an additional PHICH proposed by the present invention in addition to the existing PHICH, interpret an existing RRC signal used for reservation of PHICH resource as different meanings and use PHICH resources at different positions. The legacy UE uses the existing PHICH resource configured by an RRC signal. That is, when a value set by the RRC signal is 0, 1, 2, and 3, $N_g$ in Equation 8 above is interpreted as ⅙, ½, 1, and 2, respectively. On the other hand, the A-UE presets the value set by the RRC signal so as to interpret the value as ½ at $N_g$=0, 1 at $N_g$=1, and 2 at $N_g$=2, and 4 at $N_g$=3.

For example, when the value set by the RRC signal is 3, the legacy UE interprets the value as $N_g$=2 and maps an uplink PUSCH response to PHICHs, the number of which corresponds to PHICH resources configured based on the value, that is, $N_g$=2. On the other hand, the A-UE interprets 3 that is the value set by the RRC signal as $N_g$=4, assumes a greater resource region to be reserved in a PHICH, and maps a UL PUSCH HARQ response.

In this case, it is important to perform mapping such that a PHICH resource index of the legacy UE and a PHICH resource index of the A-UE do not collide with each other. In reality, since the legacy UE transmits data to only a PHICH resource region configured by $N_g$=2, there is a need to correct a mapping rule so as to map a PUSCH transmission parameter of the A-UE to remaining PHICH resource indexes except for a PHICH resource index of a resource region that can be occupied by the legacy UE during mapping of the PUSCH transmission parameter to the PHICH resource.

Figure 14:
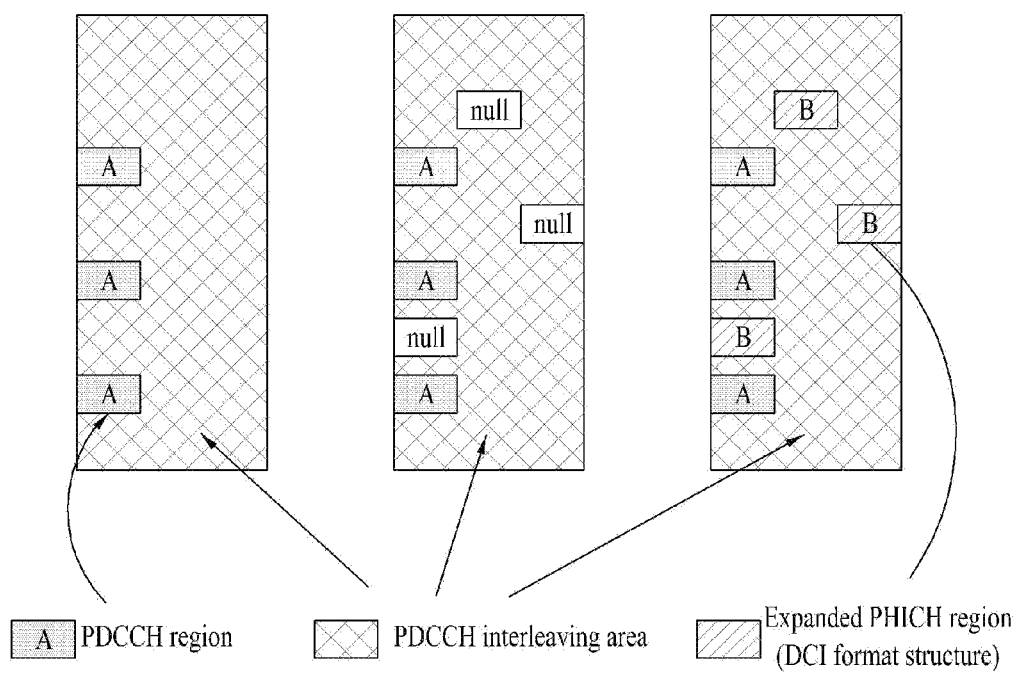
FIGS. 14 and 15 illustrate a PHICH rule according to a first embodiment of the present invention.
Figure 15:
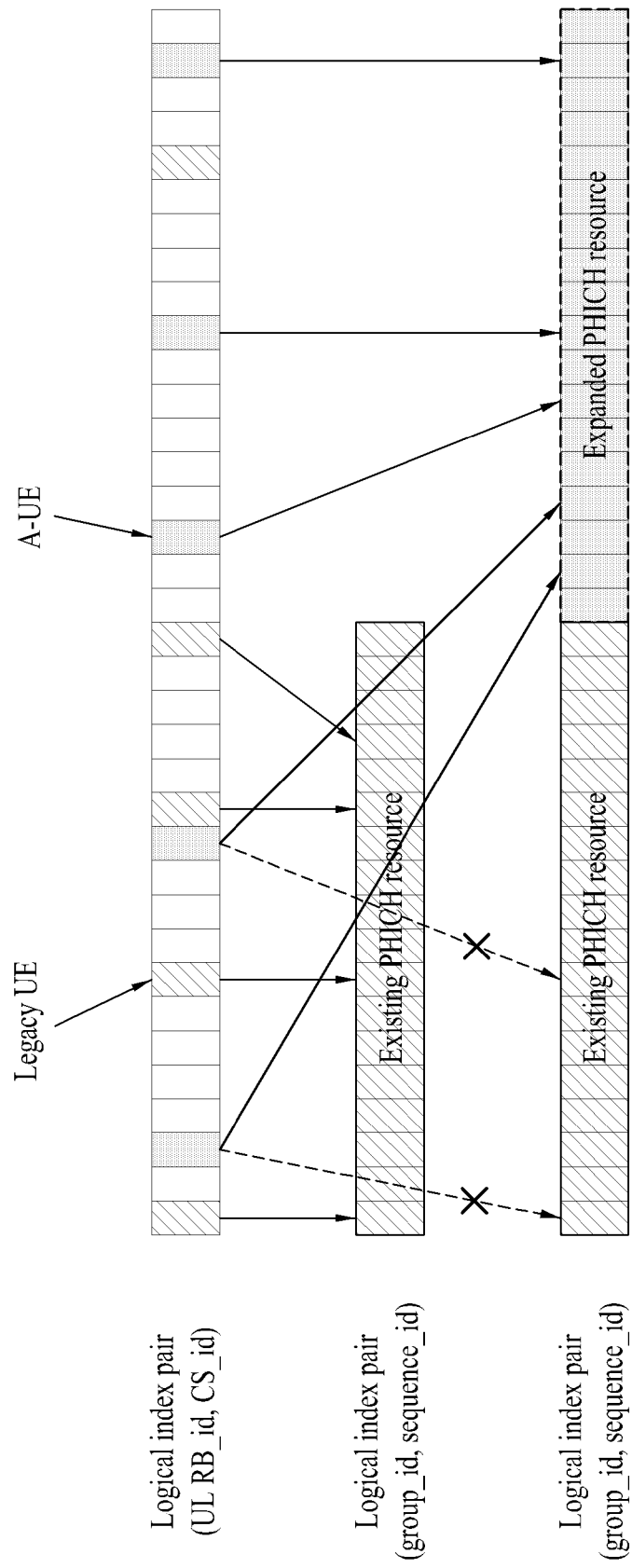

FIGS. 14 and 15 illustrate a PHICH rule according to a first embodiment of the present invention.

Referring to FIGS. 14 and 15, a legacy UE may map ACK/NACK responses to all existing PHICH resource reservation regions according to a value set by an RRC signal. On the other hand, since an A-UE interprets the value set by the RRC signal in a different way from the legacy UE, the A-UE usually sets the value as a larger value and accordingly the PHICH resource reservation region, that is, the number of PHICH groups is further increased.

However, when the conventional mapping rule is used without changes, problems can arise in that the A-UE is likely to perform mapping to a region to which the legacy UE is mapped. Of course, when $N_g$ of the A-UE is very high, a possibility that PHICH resources of the legacy UE and the A-UE collide with each other is sufficiently lowered. However, in order to completely avoid such collision, a separate mapping rule may be used for the A-UE.

As illustrated in FIGS. 14 and 15, according to the first embodiment of the present invention, the A-UE may perform mapping to an expanded PHICH resource region instead of the existing PHICH resource.

In particular, according to the first embodiment of the present invention, FIG. 14 illustrates an example in which the expanded PHICH resource region is transmitted together with a PDCCH to a region occupied by the PDCCH, instead of to an existing PHICH resource reservation region. Accordingly, by virtue of PHICH transmission according to the present invention, the problem in terms of change in the PDCCH interleaving area can be overcome.

In detail, when $N_g$ is changed to 2 from 1, a PHICH resource region is increased and on the other hand a PDCCH region is reduced, thereby changing an interleaved PDCCH mapping region. Thus, problems may arise in that the UE cannot detect DL grant or UL grant corresponding to the UE. Since the PHICH according to the present invention, that is, the PHICH, a resource region of which is expanded, is transmitted in a region interleaved in a CCE or REG unit, the corresponding region is processed in null REG or null CCE and in conclusion PDCCH mapping to the region should not be performed during PDCCH interleaving. Since resources are distributed in a different way from the existing PHICH, the obtained NULL REG may be used for transmission of PHICH with collected and expanded resources.

<Second Embodiment>

Unlike a conventional PHICH design, an expanded PHICH may be configured in a common search space or UE-specific search space of a PDCCH and an A-UE may blind-decode the expanded PHICH to search for ACK/NACK information allocated to each UE. Here, the common search space refers to a region that all UEs are supposed to blind-decode. Although resources of the region may be the common search space, the common search space may be a PHICH present in other regions, for example, a PDSCH region such as an E-PDCCH or an R-PDCCH.

Thus, a second embodiment of the present invention proposes a configuration in which ACK/NACK transmitted to a plurality of UEs, that is, a PHICH is carried in one DCI format and transmitted on one PDCCH. That is, N PHICHs are carried and transmitted in one DCI format. Basically, different RNTIs are assigned to respective UE groups such that respective UEs may search for ACK/NACK thereof on different PDCCHs. Alternatively, a PHICH search space may be configured in association with a position where a PDCCH or an E-PDCCH is transmitted.

A UE that can retrieve this DCI format may be predetermined That is, a UE that can blind-decode a DCI format-based PHICH may correspond to a UE such as an MTC or a UE with a function such as eICIC or CoMP.

Figure 16:
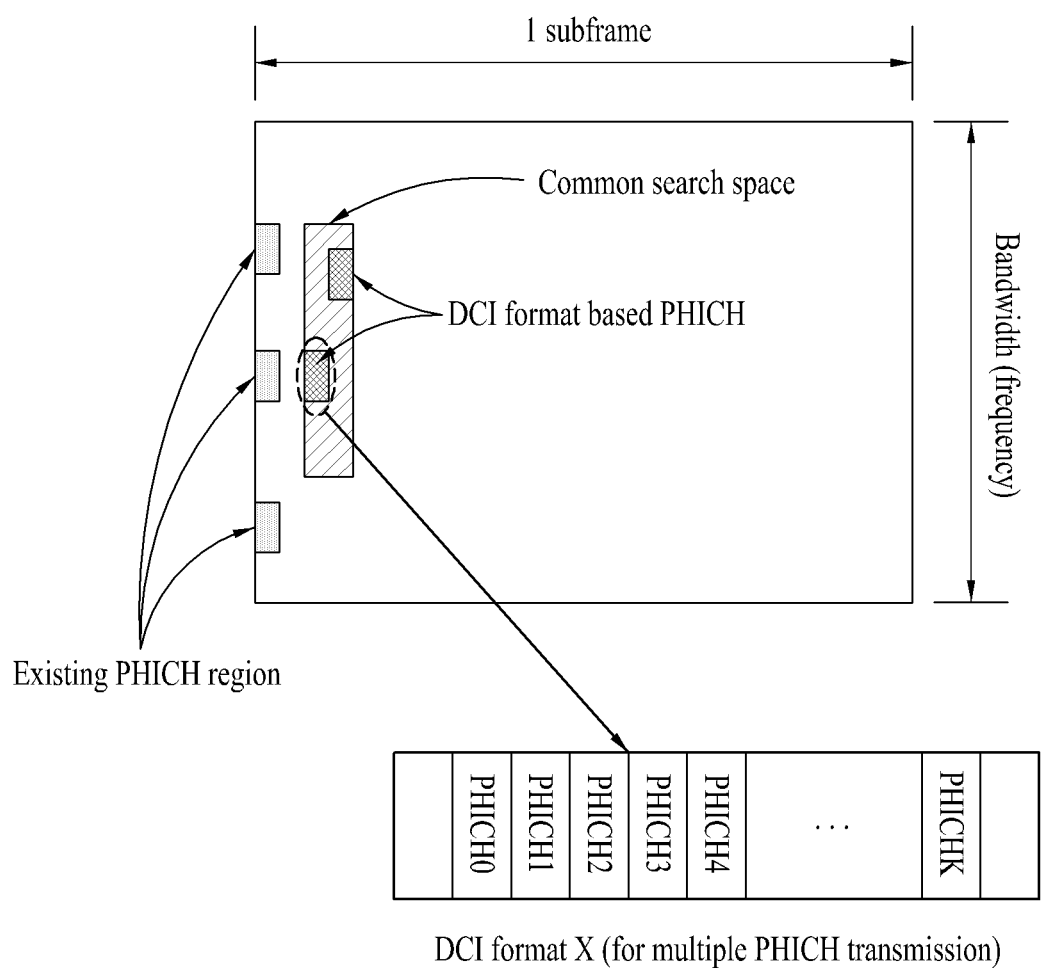
FIGS. 16 and 17 are conceptual diagrams of a DCI format-based PHICH according to a second embodiment of the present invention.
Figure 17:
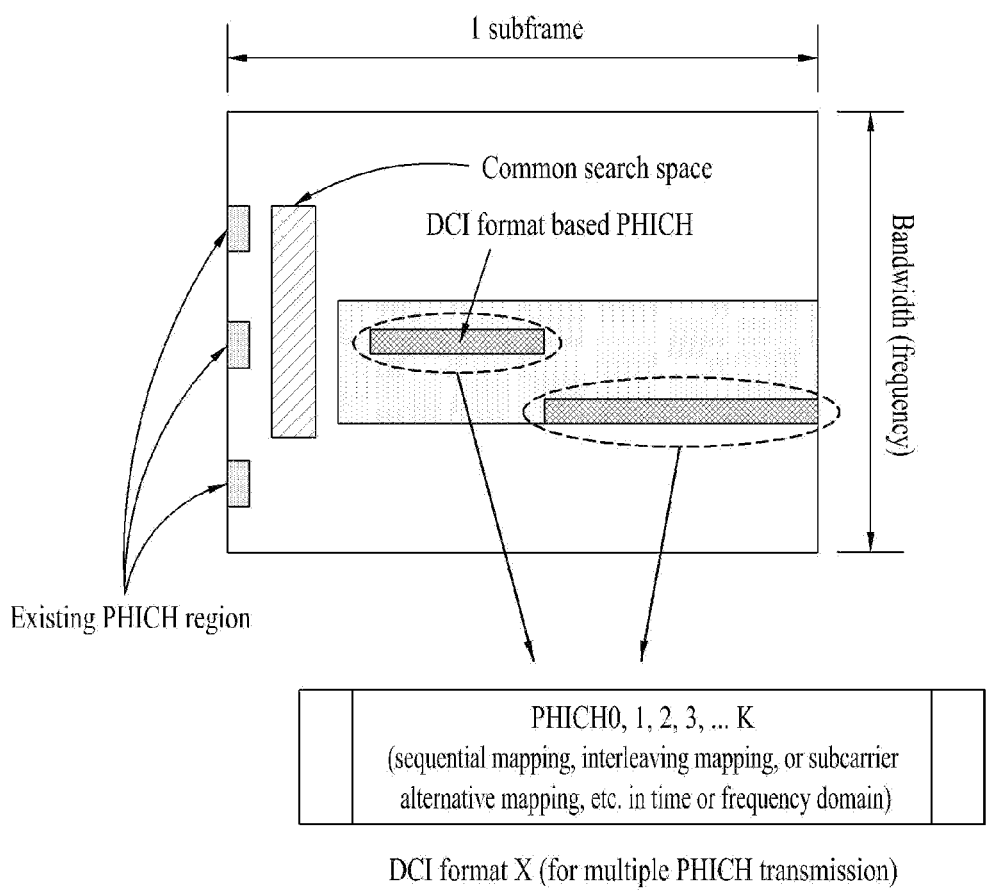

FIGS. 16 and 17 are conceptual diagrams of a DCI format-based PHICH according to a second embodiment of the present invention. Referring to FIGS. 16 and 17, a DCI format X may refer to a new DCI format or may be configured by reusing a conventional DCI format or equalizing a length thereof.

As illustrated in FIGS. 16 and 17, blind decoding may be performed in the common search space to read a PHICH of an index associated with UL transmission (PUSCH) of a UE. In addition, as another method, separate IDs, namely separate RNTIs, are set for respective UE groups and an index of a PHICH is calculated from a parameter (e.g., a PUSCH RB index and/or a DM-RS CS index) indicating a relative position at a corresponding PDCCH.

In summary, a BS configures the common search space or the UE-specific search space for a PHICH in a PDSCH, binds a plurality of PHICH on the common search space or the UE-specific search space to map a DCI format-based PHICH, masks the DCI format-based PHICH by a group-RNTI value, and transmits the DCI format-based PHICH.

From a UE point of view, since two or more PHICH groups are present, each PHICH group is masked by a separate group RNTI value and thus the UE may perform CRC testing of a PHICH group using a ground RNTI allocated to a specific group to receive PHICH information of a corresponding group. That is, a plurality of PHICH groups may be present. Each PHICH group may be allocated and masked by a group RNTI. Each UE performs CRC testing with a preset group-RNTI to acquire PHICH information.

The group-RNTI may be allocated together with a C-RNTI or a group-RNTI value that is (frequently) changed through a separate signal may be transmitted to a UE. Here, a position of a UE in the group may be preset according to an RRC signal.

In particular, when UL grant is positioned in a second slot like an R-PDCCH, a PHICH group may also be configured to be limited to a second slot. However, the group may also be positioned in a first slot by releasing this limitation.

In this case, a UL grant index of a specific UE in UL grant grouped for a UE group may be a logical index of a PHICH of the specific UE of a PHICH group without changes. Needless to say, a specific offset or parameter may be added to satisfy f (UL grant, parameter)=PHICH index. This parameter may be used to change 1:1 mapping like shuffling and interleaving during index mapping. Here, the parameter is determined in association with a UL grant CCE index for each respective group.

In addition, it may be possible to determine a PHICH index using a CCE index of UL grant. In this case, this method may be used irrespective of a PHICH group.

An aggregation level of a DCI format-based PHICH may be increased and a source bit instead of a coding rate may be increased so as to transmit a PHICH of more UEs. In a transmission mode for an MTC, blinding decoding of a transmission mode-based DCI format, that is, a general DCI format may be reduced, and remaining energy may be used to blind decode a PHICH group (a DCI format-based PHICH).

In addition, the second embodiment of the present invention may provide a method of indicating a PHICH position of a specific UE in a PHICH group without RRC signaling. Even if information regarding a PHICH group index and a PHICH position in a group is not directly signaled, when dedicated group numbers and an order in the group are assigned to a UL RB index included in UL grant, a turn of a PHICH of the UE in a PHICH grouped with a PHICH group index may be known. Here, when two RB phases are assigned, configuration may be achieved based on a minimum UL RB index.

Figure 18:
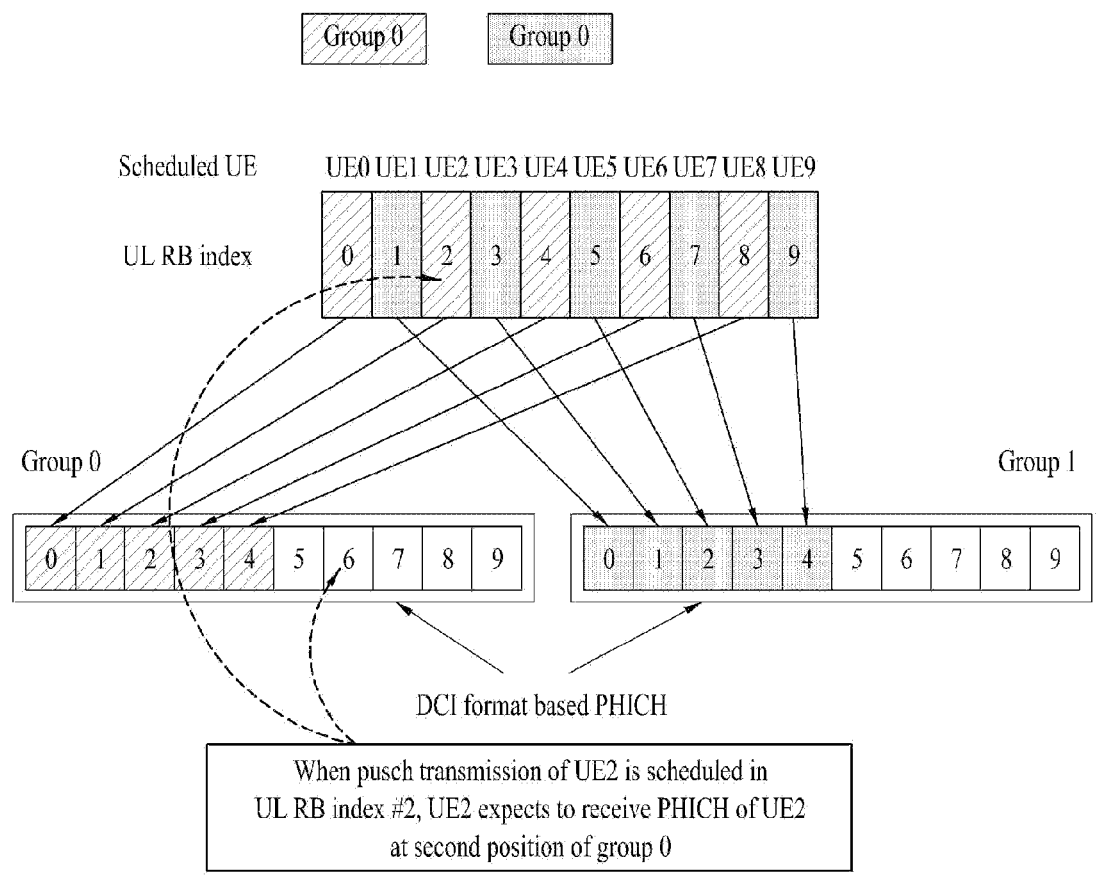
FIG. 18 is a diagram illustrating a method of detecting a corresponding PHICH in a DCI format-based PHICH according to a second embodiment of the present invention.

FIG. 18 is a diagram illustrating a method of detecting a corresponding PHICH in a DCI format-based PHICH according to a second embodiment of the present invention.

Referring to FIG. 18, when a UE2 is scheduled on a UL RB index 2, a UE2 may know that PHICH ACK/NACK is at a second portion of a group 0. Positions of a dedicated group and a PHICH of the group may be predetermined for each respective UL RB and thus it may be possible to decode a PHICH without separate RRC signaling. In FIG. 18, an RB with an even number as an RB index is set to a group 0 and an RB with an odd number as an RB index is set to a group 1.

Although FIG. 18 illustrates a case in which only one RB is allocated to all UEs, a plurality of RBs may be allocated according to a UE. In this case, a PHICH group and a PHICH position of a UE in the PHICH group may be determined based on a minimum index, a maximum index, or a predetermined index among a plurality of RBs.

Furthermore, this method is advantageous in that PHICH resources that are supposed to be pre-reserved are largely reduced. For example, in FIG. 18, when all UEs are scheduled on an even number index only, all PHICHs are transmitted in a group 0 in reality and thus resources of a group 1 are not required. From this point of view, a system may be managed to minimize reserved resources.

Figure 19:
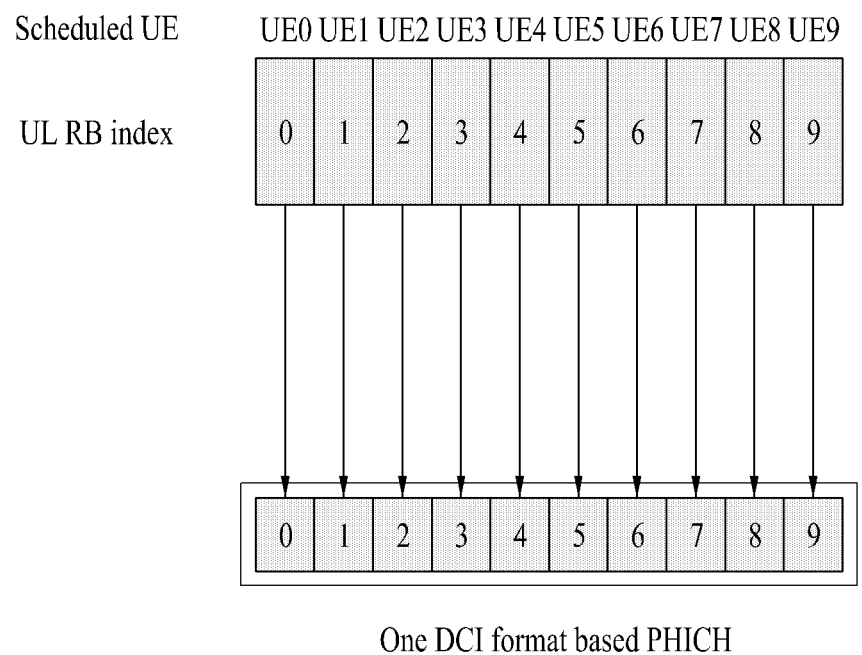
FIG. 19 is another diagram illustrating a method of detecting a corresponding PHICH in a DCI format-based PHICH according to the second embodiment of the present invention.

FIG. 19 is another diagram illustrating a method of detecting a corresponding PHICH in a DCI format-based PHICH according to the second embodiment of the present invention.

Referring to FIG. 19, assuming that a UL bandwidth is 10 RBs and all 10 RBs are allocated to 10 users, a PHICH with a length for transmitting 10 PHICH resources may be ensured and managed. However, in this case, a DCI format length may be excessively increased.

<Third Embodiment>

A third embodiment of the present invention, which is embodied by expanding the DCI format-based PHICH proposed by the second embodiment of the present invention to a codeword (CW) transmission and a MIMO scheme, will be described below.

In case of UL MIMO, since a plurality of codewords (CWs) can be transmitted, PHICH responses are required by as much as the number of CWs assuming a DL PHICH response is transmitted per CW. For reference, in an LTE-A system, two CWs may be transmitted in UL.

According to the second embodiment of the present invention, PHICH resource reservation may be achieved without any separate signal by predetermining a PHICH group and a turn of the PHICH in the group to a UL RB index. However, since one PHICH group and a position of a PHICH in the PHICH group are determined as UL RB resource, when a plurality of CWs are allocated to the same resource, PHICH resources corresponding to the CWs may collide.

Figure 20:
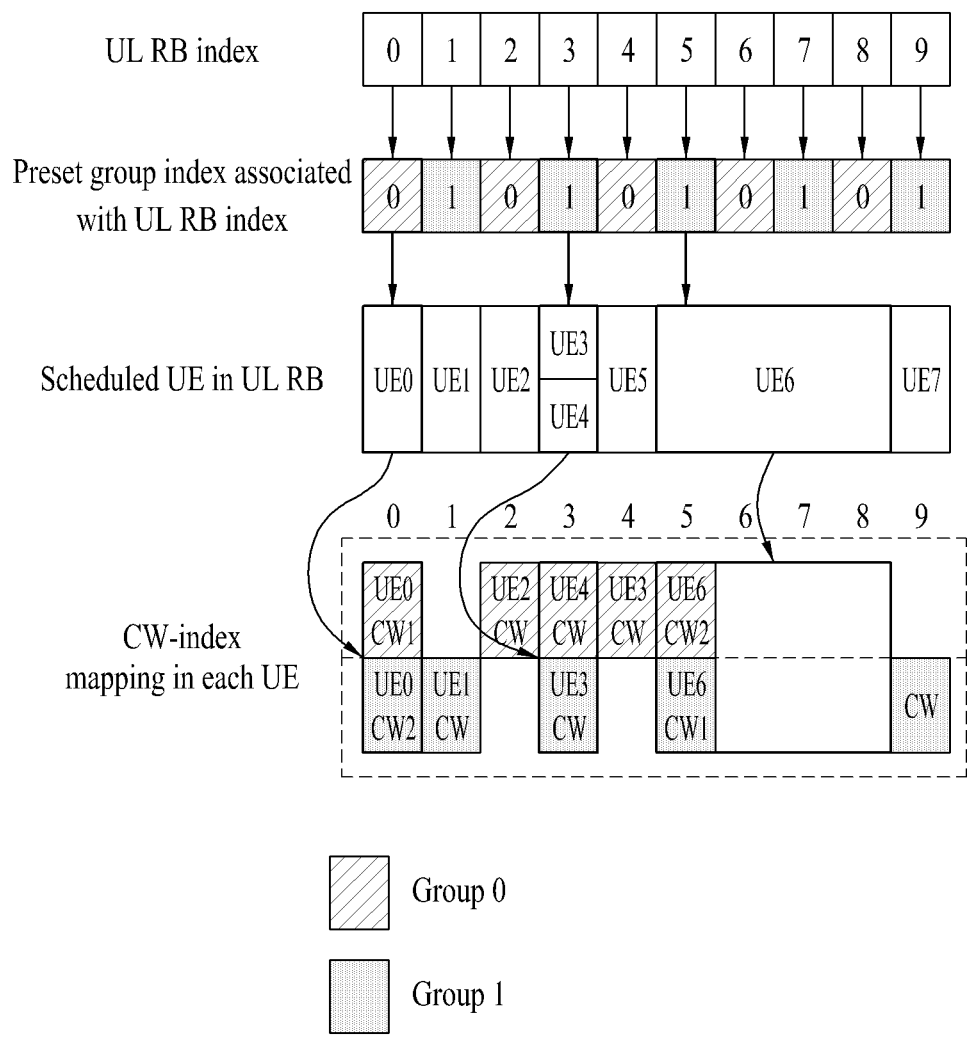
FIG. 20 is a diagram illustrating a method for preventing collision between PHICH resources in a MIMO system according to a third embodiment of the present invention.

FIG. 20 is a diagram illustrating a method for preventing collision between PHICH resources in a MIMO system according to a third embodiment of the present invention.

In FIG. 20, a UE0 corresponds to a case in which a CW 2 is scheduled on a UL RB index 0. In this regard, a CW1 is transmitted to a first position of a group 0 and a CW2 is transmitted to a first position of a group 1 and thus a PHICH response resource position may be monitored and blind-decoded. In particular, FIG. 20 assumes that UL RB indexes 0 to 9 are equally classified as the group 0 and the group 1 and predetermined. Needless to say, the indexes may be classified as more groups as necessary. When PHICHs that have a large UL RB index and are bound in a PHICH group are limited, a group number needs to be determined so as to accommodate all UL RB indexes. Furthermore, in order to support a MIMO system, twice or more PHICH resources are required compared to a non-MIMO system. As described with reference to FIG. 20, in order to support spatial multiplexing for transmitting a maximum of two CWs to 10 UL RBs, two PHICH groups for simultaneously carrying 10 PHICHs are required.

In order to support MU-MIMO, a similar method may be applied. In order to simultaneously schedule a UE3 and a UE4 on a UL RB index 3 to achieve spatial multiplexing, in case of the UE3, a UL RB index is 3 and thus a corresponding PHICH is transmitted to a group 1. In addition, in case of the UE4, an index of the group 1 is already occupied by the UE3 and thus a PHICH is transmitted to an index 3 of the group 0. Needless to say, this order may be reversed. However, a turn of a spatially multiplexed UE needs to be indicated to a corresponding RB, which may be achieved by assumption based on an antenna port of an allocated reference signal and a scrambling ID or by explicit indication.

When a PHICH group is configured as a DCI format-based PHICH and blind-decoded in the same form as a PDCCH, both the group 0 and the group 1 need to be blind decoded as illustrated in FIG. 20. In order to maintain total blind decoding complexity, the system may be designed in such a way that sum of blind decoding complexity in the group 2 of the UE0 does not exceed conventional blind decoding complexity.

According to the third embodiment of the present invention, a UE may apply different cyclic shifts (CSs) of DM-RS used for UL transmission to respective CWs to differentiate resource indexes of a PHICH group. Here, the CSs of the DM-RS may be contained in a DCI format for UL scheduling and explicitly indicated or indicated through a separate signal.

Figure 21:
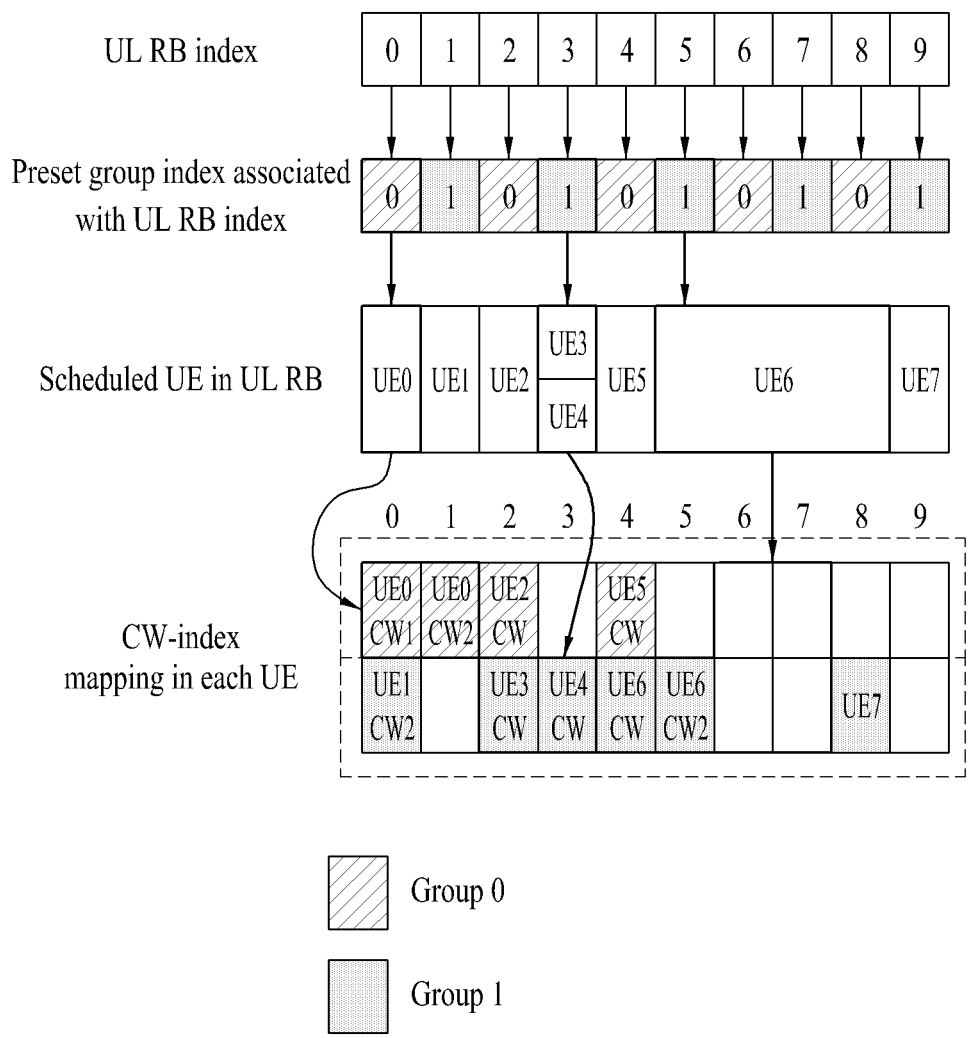
FIG. 21 is a diagram illustrating a method for preventing collision between PHICH resources in a MIMO system according to the third embodiment of the present invention.

FIG. 21 is a diagram illustrating a method for preventing collision between PHICH resources in a MIMO system according to the third embodiment of the present invention.

Although FIG. 20 illustrates an example in which CWs are classified as different groups, FIG. 21 illustrates an example in which CWs are allocated to contiguous indexes in the same group. The example illustrated in FIG. 21 is advantageous in that blind decoding complexity is reduced when a PHICH group is embodied in the form of PDCCH.

The UE0 allocated to a UL RB index 0 transmits the CW2 using a single user MIMO scheme. Referring to FIG. 20, blind decoding needs to be separately performed on two PHICH groups such that the UE0 may acquire PHICHs of all UEs. However, referring to FIG. 21, blinding decoding is advantageously performed using only one RNTI by allocating CWs of the same user to the same group. In addition, PHICH resources may be remarkably reduced by performing scheduling on only a UL RB index connected to an index of the group 0.

According to the present embodiment, different DM-RS CSs may be applied to respective CWs so as to differentiate resource indexes of a group PHICH. Here, a DM-RS CS may be contained in a DCI format for UL scheduling and dynamically indicated. Alternatively, when corresponding resources are insufficient or are not present, the DM-RS CS may be indicated via a separate RRC, MAC, and physical signal.

Unlike the aforementioned features, a conventional PHICH configuration instead of a PDCCH configuration may be used to transmit a PHICH group. That is, multiple PHICHs may be transmitted using code division multiplexing of the same resource. For example, when 8 UEs are simultaneously MU-MIMO scheduled on a UL RB, the 8 UEs may be bound as one PHICH group and transmitted. Here, the PHICH group refers to configuration of PHICHs using 8 or more orthogonal sequences in the same resource region.

Here, when a PHICH group ID and corresponding ACK/NACK position information (here, the ACK/NACK position may be associated with a corresponding DM-RS CS index) in the PHICH group are previously linked with a UL RB index and a PUSCH is scheduled on specific UL resource, even if there is no separate signal, a PHICH group ID and an A/N position may be known using the association method.

Thus, the UE may know where a DL PHICH is originated via inference from a UL RB index and/or a DM-RS CS index. For example, in case of UL RB index=K and DM-RS CS index=L, a group ID and an A/N position may be known. Needless to say, these cases are purely exemplary and given value(s) and acquired value(s) may be achieved via various combinations. Based on the combinations, some of group IDs and PHICH positions may be transmitted via separate signals so as to relieve scheduling restriction.

Figure 22:
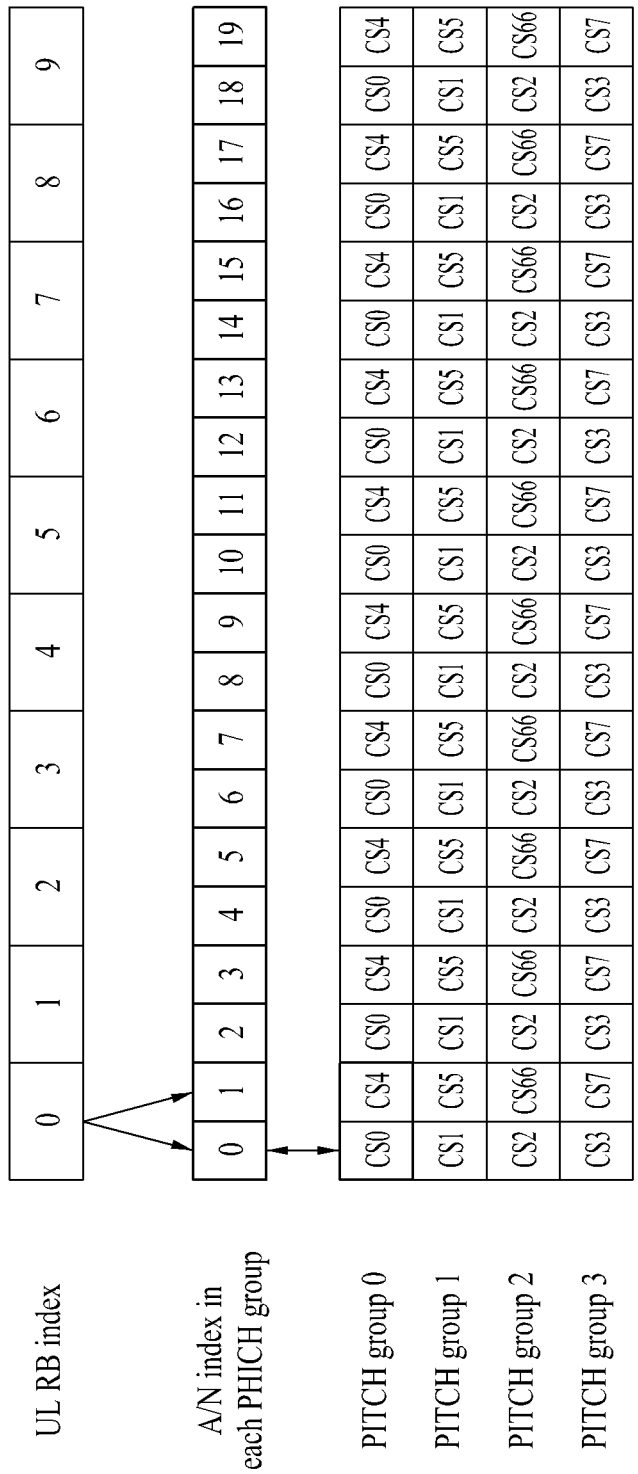
FIGS. 22 and 23 are other diagrams illustrating a method for preventing collision between PHICH resources in a MIMO system according to the third embodiment of the present invention.
Figure 23:
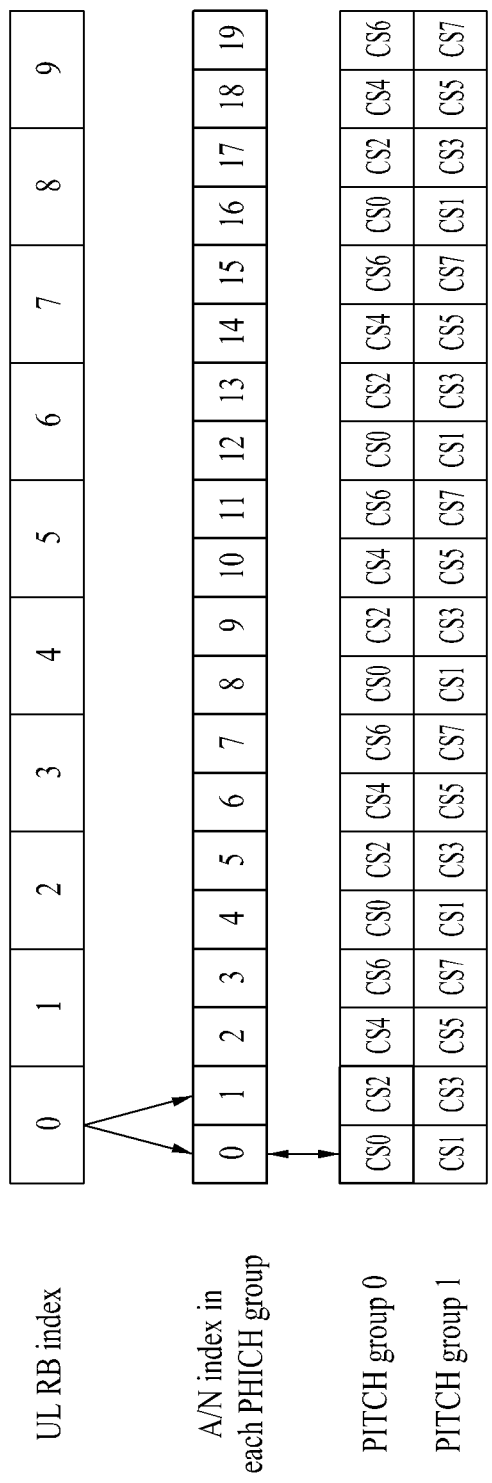

FIGS. 22 and 23 are other diagrams illustrating a method for preventing collision between PHICH resources in a MIMO system according to the third embodiment of the present invention.

In FIG. 22, it is assumed that 2 CWs, DM-RS CS0 and CS4 are allocated to a UL RB index 0 of one UE. Similarly, in FIG. 23, it is assumed that 4 CWs, DM-RS CS0, CS2, CS4, and CS6 are allocated to a UL RB index 0 of one UE. Needless to say, it is assumed that different CSs are allocated in case of MU-MIMO. In FIG. 22, 2 CWs of one UE are mapped to a PHICH group 0 and A/N indexes in a PHICH group use 0 and 1. That is, from a UE point of view, the A/N indexes 0 and 1 in the PHICH group 0 are monitored to acquire A/N.

This method may be possible using the same format as an existing PHICH. Here, in order to adjust a PHICH to the same length as the conventional DCI format, a length of an orthogonal sequence may be adjusted to be larger than existing SF4 so as to simultaneously generate 32 or 64 PHICH resource indexes using SF32 or SF64 similarly to a source bit size of a DCI format, that is, 32 bits or 64 bits.

<Fourth Embodiment>

A fourth embodiment of the present invention proposes a method for transmitting a PHICH to a specific region and appropriately receiving the PHICH by a UE (or a relay node or an MTC device). In particular, the fourth embodiment focuses on a design for sufficiently maintaining compatibility with an E-PDCCH or R-PDCCH used in a backhaul link.

An R-PDCCH for an existing LTE-A backhaul link (that is, link between an eNB and a relay) differentiates a search space so as to transmit a PDCCH for DL grant and a PDCCH for UL grant to different slots in reality. In addition, conventionally, the UL grant is replaced with HARQ ACK/NACK without a channel such as a PHICH in consideration of backhaul link and channel characteristics of a relay apparatus.

The fourth embodiment of the present invention proposes a method of transmitting a (subset) (group) PHICH to a portion of a resource region (e.g., one or more RB sets) in which a search space of UL grant is configured considering that the characteristics of a PHICH are closely associated with UL scheduling. In this case, an R-PDCCH of a backhaul link may be positioned in a specific region of a second slot of every subframe. In particular, a PRB space of UL grant is greater than a PRB space of DL grant in terms of equal distribution and thus the PHICH may be positioned in the second slot.

Since a dedicated PHICH is positioned at any position of a UL grant search space, separate (RRC) signaling of a PHICH position is not required. However, the PHICH needs to be blind-decoded like UL grant. Alternatively, a specific region of a search space for UL grant may be used for PHICH transmission only.

A common/group PHICH may be embodied in the same way. However, all UEs need to be notified of the PHICH position. In addition, the PHICH search space needs to be commonly indicated to all UEs. It may be possible to configure a search space for a PHICH in a common RB of all UEs in the dedicated search space.

As another method of determining the PHICH position, the position may be determined as a first slot or a second slot of every subframe according to a UL RB index. Alternatively, whether the PHICH is positioned a DL grant search space or a UL grant search space may be determined. The PHICH position may be determined such that some UL RB indexes may be used to transmit the PHICH to a first slot (that is, a DL grant search space) and remaining UL RB indexes may be used to transmit the PHICH to a second slot (that is, a UL grant search space). Here, the UL RB index is purely exemplary. Together with or separately from the UL RB index, parameters such as a DM-RS CS or a PHICH aggregation level may complexly or independently affect determination of the PHICH position. Furthermore, the PHICH position may also be determined according to a transmit block index, a codeword index, or a layer index. In this case, when a MU-MIMO complies with this rule, a specific UE (among spatially multiplexed UEs) may expect a PHICH in a first slot and another UE may expect a PHICH in a second slot.

As another method of determining a PHICH position, the PHICH may be positioned in N OFDM symbols of a second slot. In case of N=1, a PHICH may be transmitted to only a first symbol of the second slot. N=3 is advantageous in that 3 symbols are occupied by a PHICH such that DL grant (when a PCFICH indicates 3 symbols) and UL grant are the same as or similar to a source region (e.g. RE number) occupied by the same RB. When this method is used, it may be possible to transmit a PHICH to only N OFDM symbols of RBs configured to a UL grant search space. As necessary, the number of symbols of a second slot for transmission of the PHICH may be changed by a separate signal.

As an R-PDCCH is transmitted to a specific layer or a specific antenna port, the PHICH may also be transmitted to the specific layer or the specific antenna port. A transmission region (i.e., an RB, a layer, or an antenna port) that is determined in the above suggested method may be changed over time or according to a cell ID.

Figure 24:
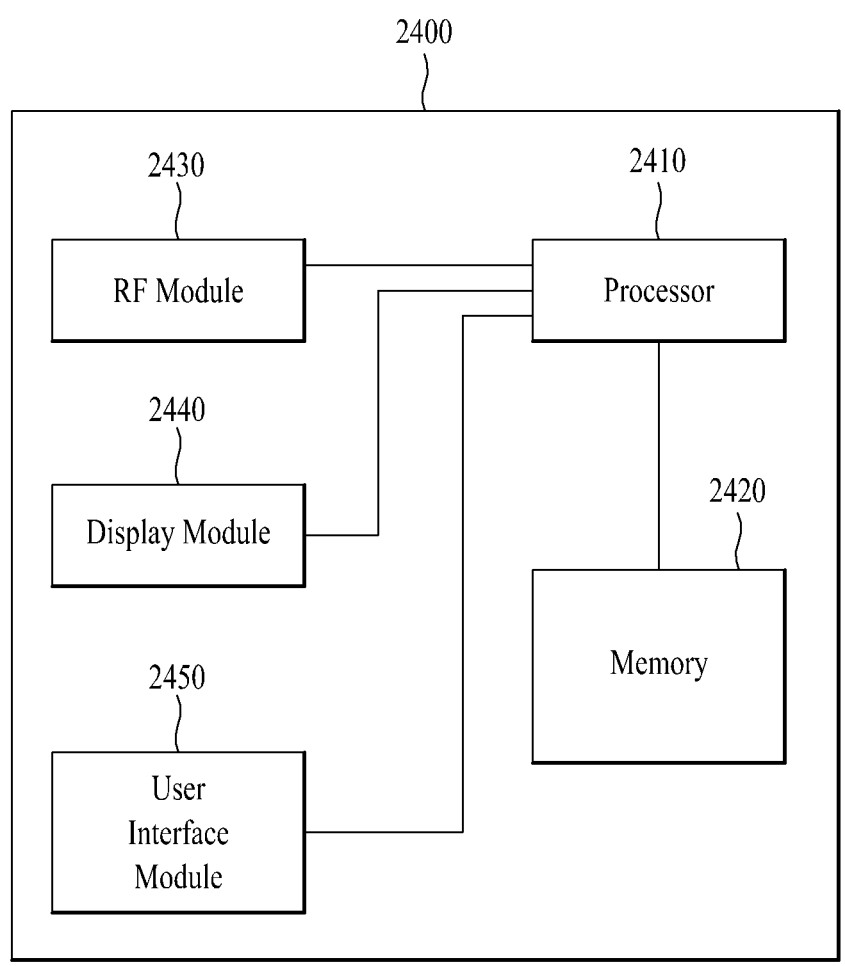
FIG. 24 is a block diagram of a communication apparatus according to an embodiment of the present invention.

FIG. 24 is a block diagram of a communication apparatus 2400 according to an embodiment of the present invention.

Referring to FIG. 24, the communication apparatus 2400 includes a processor 2410, a memory 2420, a radio frequency (RF) module 2430, a display module 2440, and a user interface module 2450.

The communication apparatus 2400 is shown for convenience of description and some modules thereof may be omitted. In addition, the communication apparatus 2400 may further include necessary modules. In addition, some modules of the communication apparatus 2400 may be subdivided. The processor 2410 is configured to perform an operation of the embodiment of the present invention described with reference to the drawings. For a detailed description of the operation of the processor 2410, reference may be made to the description associated with FIGS. 1 to 23.

The memory 2420 is connected to the processor 2410 so as to store an operating system, an application, program code, data and the like. The RF module 2430 is connected to the processor 2410 so as to perform a function for converting a baseband signal into a radio signal or converting a radio signal into a baseband signal. To this end, the RF module 2430 performs analog conversion, amplification, filtering and frequency up-conversion or inverse processes thereof. The display module 2440 is connected to the processor 2410 so as to display a variety of information. As the display module 2440, although not limited thereto, a well-known device such as a liquid crystal display (LCD), a light emitting diode (LED), or an organic light emitting diode (OLED) may be used. The user interface module 2450 is connected to the processor 2410 and may be configured by a combination of well-known user interfaces such as a keypad and a touch screen.

The embodiments of the present invention described above are combinations of elements and features of the present invention. The elements or features may be considered selective unless otherwise mentioned. Each element or feature may be practiced without being combined with other elements or features. Further, an embodiment of the present invention may be constructed by combining parts of the elements and/or features. Operation orders described in embodiments of the present invention may be rearranged. Some constructions of any one embodiment may be included in another embodiment and may be replaced with corresponding constructions of another embodiment. It is obvious to those skilled in the art that claims that are not explicitly cited in each other in the appended claims may be presented in combination as an embodiment of the present invention or included as a new claim by subsequent amendment after the application is filed.

The embodiments of the present invention may be achieved by various means, for example, hardware, firmware, software, or a combination thereof. In a hardware configuration, an embodiment of the present invention may be achieved by one or more ASICs (application specific integrated circuits), DSPs (digital signal processors), DSDPs (digital signal processing devices), PLDs (programmable logic devices), FPGAs (field programmable gate arrays), processors, controllers, microcontrollers, microprocessors, etc.

In a firmware or software configuration, an embodiment of the present invention may be implemented in the form of a module, a procedure, a function, etc. Software code may be stored in a memory unit and executed by a processor. The memory unit is located at the interior or exterior of the processor and may transmit and receive data to and from the processor via various known means.

It will be apparent to those skilled in the art that various modifications and variations can be made in the present invention without departing from the spirit or scope of the invention. Thus, it is intended that the present invention cover the modifications and variations of this invention provided they come within the scope of the appended claims and their equivalents.

INDUSTRIAL APPLICABILITY

Although an example of applying a method and apparatus for transmitting a downlink (DL) control channel from a base station (BS) in a wireless communication system to a $3^{rd}$ generation partnership project (3GPP) long term evolution (LTE) system has been described, the present invention is applicable to various wireless communication systems in addition to the 3GPP LTE system.

The invention claimed is:

1. A method for receiving acknowledgement/negative-ACK (ACK/NACK) by a user equipment (UE) in a wireless communication system, the method comprising:
    configuring a first search space for the UE;
    receiving an uplink grant from a first base station (BS) by monitoring a physical downlink control channel (PDCCH) carrying the uplink grant in the first search space for the UE;
    transmitting an uplink data signal to a second BS using the uplink grant;
    configuring a second search space for a UE group,
    wherein the UE group comprises a plurality of UEs including the UE; and
    receiving, from the first BS, downlink control information (DCI) by monitoring a DCI based physical HARQ (Hybrid—Automatic Repeat and request) indicator channel (PHICH) in the second search space for the UE group,
    wherein the DCI is generated by concatenating ACK/NACK responses corresponding to the plurality of UEs; and
    obtaining an ACK/NACK response of the uplink data signal corresponding to the UE from the ACK/NACK responses corresponding to the plurality of UEs, wherein a position of the ACK/NACK response corresponding to the UE in the ACK/NACK responses corresponding to the plurality of UEs is determined using an order of the UE in the UE group, wherein information on the order of the UE in the UE group is included in the uplink grant, and wherein, when the first search space is configured in a second slot, the second search space for the UE group is configured in the second slot.

2. The method according to claim 1, wherein the DCI based PHICH is masked by an identifier associated with the UE group.

3. A user equipment (UE) of a wireless communication system, the UE comprising:

a processor configured to configure a first search space for the UE and a second search space for a UE group, wherein the UE group comprises a plurality of UEs including the UE; and a radio frequency module configured to receive, from the first BS, downlink control information (DCI) by monitoring a DCI based physical HARQ (Hybrid—Automatic Repeat and request) indicator channel (PHICH) in the second search space for the UE group, wherein the DCI is generated by concatenating ACK/NACK responses corresponding to the plurality of UEs, and obtain an ACK/NACK response of the uplink data signal corresponding to the UE from the ACK/NACK responses corresponding to the plurality of UEs, wherein a position of the ACK/NACK response corresponding to the UE in the ACK/NACK responses corresponding to the plurality of UEs is determined using an order of the UE in the UE group, wherein information on the order of the UE in the UE group is included in the uplink grant, and wherein, when the first search space is configured in a second slot, the second search space for the UE group is configured in the second slot.

4. The UE according to claim 3, wherein the DCI based PHICH is masked by an identifier associated with the UE group.

* * * * *